US011451756B2

(12) United States Patent
Stessen

(10) Patent No.: US 11,451,756 B2
(45) Date of Patent: Sep. 20, 2022

(54) GAMUT MAPPING FOR HDR (DE)CODING

(71) Applicant: KONINKLIJKE PHILIPS N.V., Eindhoven (NL)

(72) Inventor: Jeroen Hubert Christoffel Jacobus Stessen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 466 days.

(21) Appl. No.: 16/619,114

(22) PCT Filed: Jun. 13, 2018

(86) PCT No.: PCT/EP2018/065691
§ 371 (c)(1),
(2) Date: Dec. 4, 2019

(87) PCT Pub. No.: WO2018/229145
PCT Pub. Date: Dec. 20, 2018

(65) Prior Publication Data
US 2020/0099908 A1 Mar. 26, 2020

(30) Foreign Application Priority Data
Jun. 13, 2017 (EP) ..................... 17175689

(51) Int. Cl.
*H04N 9/68* (2006.01)
*H04N 19/186* (2014.01)
(Continued)

(52) U.S. Cl.
CPC ............... *H04N 9/68* (2013.01); *H04N 9/67* (2013.01); *H04N 9/77* (2013.01); *H04N 19/186* (2014.11); *H04N 19/46* (2014.11)

(58) Field of Classification Search
CPC .. H04N 9/68; H04N 9/67; H04N 9/77; H04N 19/186; H04N 19/46; H04N 1/64; H04N 5/20; H04N 1/603
See application file for complete search history.

(56) References Cited

U.S. PATENT DOCUMENTS 10,652,588 B2 * 5/2020 Kerofsky ................ G06T 5/009
2009/0278982 A1 11/2009 Imai et al.
(Continued)

OTHER PUBLICATIONS

Search Report and Written Opinon From PCT/EP2018/065691 dated Sep. 14, 2018.
(Continued)

*Primary Examiner* — Paulos M Natnael

(57) ABSTRACT

To enable good quality HDR image decoding, as corresponding SDR images which are typically defined in a narrower Rec. 709 gamut, the inventor found a pragmatic method of converting a high dynamic range image (HDR 2020) comprising a pixel having a first color (C in) having a first color saturation, into a standard dynamic range image (SDR 709) having a peak luminance of 100 nit, in which that pixel has a second color (C out) having a second color saturation which is lower than the first color saturation, the converting comprising: performing a color space conversion (601) comprising applying a color matrix which maps a first RGB representation of the first color defined according to first red, green and blue primaries to a second RGB representation (RGB sec) of that pixel color according to second RGB primaries, yielding an intermediate image (HDR IM); applying a reversible gamut mapping to the second RGB representation, yielding a mapped color (C map); and applying a luminance mapping (TOM) to the luminance of the mapped color, to obtain the low dynamic range image (SDR 709) with the pixel having an output color (C out) which has a different luminance (L Out) than the luminance of the
(Continued)

mapped color, and outputting the standard dynamic range image (SDR 709), characterized in that the reversible gamut mapping comprises applying a respective mapping function (F1, F2, F3) to each of the three R, G, and B color components of the second RGB representation to respectively obtain output R, G, and B color components (Ro, Go, Bo) which define the mapped color, which respective three mapping functions comprise two linear segments (501, 502), of which one of the segments (501) corresponds to an identity transform which segment begins at a threshold value (TP) of respectively the input red, green or blue color component of the second RGB representation, and the second linear segment connects from the threshold value (TP) to a most negative value of the respective component of the second RGB representation, and wherein the threshold value (TP) is calculated by multiplying the values of the other two components of the second RGB representation than the color component for which the threshold value (TP) is calculated by respective constants (kRG, kRB) and summing those two multiplied contributions.

20 Claims, 9 Drawing Sheets

(51) Int. Cl.
*H04N 19/46* (2014.01)
*H04N 9/67* (2006.01)
*H04N 9/77* (2006.01)

(56) References Cited

U.S. PATENT DOCUMENTS

2017/0064334 A1 3/2017 Minoo
2018/0278967 A1* 9/2018 Kerofsky ............. H04N 19/186

OTHER PUBLICATIONS

Khan Ishtiaq Rasool ED—Abdallah Maha et al: "HDR image encoding using reconstruction functions based on piecewise linear approximations", Multimedia Systems, ACM, New York, NY, US, vol. 21, No. 6, Nov. 13, 2014 (Nov. 13, 2014), pp. 615-624.
Yasir Salih et al: "Tone mapping of HDR images: A review", Intelligent and Advanced Systems (ICIAS), 2012 4th International Conference on, IEEE, Jun. 12, 2012 (Jun. 12, 2012), pp. 368-373.
Lasserre S et al: "High Dynamic Range video coding", 16.JCT-VC Meeting; Jan. 9, 2014-Jan. 17, 2014; San Jose; (Joint Collaborative Team on Video Coding of ISO/IEC JTC1/SC29/WG11 and ITU-T SG.16 ); URL: http://wftp3.itu.int/av-arch/jctvc-site/,, No. JCTVC-P0159, Jan. 5, 2014.
Stessen "Extended Color Gamut for Consumers—The Display Side" HPA Technology Retreat 2007, Rancho Mirage Jan. 30, 2007.

* cited by examiner

GAMUT MAPPING FOR HDR (DE)CODING

FIELD OF THE INVENTION

The invention relates to methods and apparatuses for handling colors which are out of gamut for a smaller color gamut used in communicating a low dynamic range image which is representing a higher dynamic range image with a larger color gamut.

BACKGROUND OF THE INVENTION

Until a couple of years ago, all video and most still images were encoded according to the so-called low dynamic range (LDR) philosophy, also called standard dynamic range (SDR). That meant, whatever the captured original scene was, that the maximum of the code (typically 8 bit luma Y'=255, and similar for the non-linear approximately square root R'G'B' color components; or 100% voltage for analog display driving; later upgraded to 10 bit for higher color precision) should by standardized definition correspond to, i.e. be rendered on, a display with a display peak brightness PB_D (i.e. the brightest white color which that display can render) being by standard agreement 100 nit. This was done because all displays were actually almost identical as regards their colorimetric capabilities, i.e. they could (only) render luminances between 0.1 and 100 nit, and that is what one had to make do with to make the colors of any image which was desired. But also, it made things simple, since one had a clear single color gamut in which one could define reasonably looking images and their colors, for any scene, even originally HDR scenes like a cave, by brightening the cave interior, and typically clipping the outside world pixels to white, or bright pastel colors. Such displays could render quite nice images, and consumers don't complain, in particular because the reflectancies of natural objects range about between 95% and 0.5%, so if only during content production one took care of the illumination of the scene by making it reasonably uniform, the end viewer would indeed see all objects nicely, with naturalistic colors and relative brightness. However, not so if a scene had to be rendered naturalistically which contained either bright light regions or darks shadowy areas.

If people bought an actual display which was a little darker or brighter than the theoretic optimum of PB_D=100 nit, it was assumed that the viewer's visual system would adapt so that the image would still look appropriate and even the same as on the reference 100 nit display, rather than e.g. annoyingly too bright (in case one has e.g. a night scene in a horror movie which should have a dark look).

The black of such a SDR display may typically be 0.1 nit in good circumstances, yet 1 nit or even several nits in worst circumstances, so the SDR display dynamic range (the brightest white divided by the darkest viewable black) would be 1000:1 at best.

This corresponds nicely to nearly uniformly illuminated scenes (and rendered as if uniformly lit, which incidentally can be trick to make derivative images of non-uniformly lit scenes of higher luminance dynamic range), and an 8 bit coding for all the required to be rendered pixel grey values or luminances, having a gamma of approximately 2.0, or encoding inverse gamma 0.5, Rec. 709 was and still is the typically used SDR video coding standard. It has a non-linear R'G'B' code allocation function, aka. OETF which can theoretically be shown to precisely cover this needed 1000:1 relative or normalized luminance dynamic range. Typically also cameras had problems capturing simultaneously both very bright and rather dark regions, i.e. a scene as seen outside a window or car window would typically be clipped to white, already in the photo-electron accumulating pixel well (giving red, green and blue additive color components R=G=B=max., corresponding to their square root coded non-linear R'G'B' values R'=G'=B'=255). Note that if in this application a dynamic range is specified firstmost with a peak brightness (i.e. the brightest rendered or renderable luminance) only, we assume that the lowest luminance value is pragmatically zero (whereas in practice it may depend on viewing conditions such as display front plate or cinema screen light reflection, e.g. 0.1 nit), and that those further details are irrelevant for the particular explanation.

Note also, something which has become clearer during the HDR research, but may not be readily clear to everybody hence is mentioned here to make sure everybody understands it, that a code system (just 10 bit numbers) by itself does not natively have a dynamic range, unless one associates a reference display with it, which states that the maximum code value e.g. R'=G'=B'=Y'=1023 should correspond with a coding peak brightness PB_C of 100 nit (and mapped to such 100 nit whatever the actual PB_D), or alternatively, for another HDR image coding 1000 nit, etc.

In particular, contrary to what is usually pre-assumed, the number of bits used for the color components of pixels, like their lumas, is not a good indicator of dynamic range, since e.g. a 10 bit coding system may encode either a HDR video (in case PB_C=1000 nit), or an SDR video (in case the PB_C for those same codes is 100 nit).

What makes HDR image handling and in particular the color handling tricky is also the electro-optical transfer function EOTF of the reference display associated with the coding, i.e. defining the relationship between the several luma codes [0, 1023] and the corresponding luminances of the pixels, as they need to be rendered on a display, and there can be several different EOTF function shapes for coding HDR images, in contrast to the sole Rec. 709 EOTF of SDR image coding.

In this text it is assumed that when a HDR image or video is mentioned, it has a corresponding peak brightness PB_C or maximum luminance for the highest luma code (or equivalently highest R', G', B' values in case of an RGB coding e.g. rather than an YCbCr encoding) which is higher than the SDR value of 100 nit, and typically at least 6× higher. Whereas HDR images might also have deeper encoded blacks, oftentimes the main difference is that they contain far brighter pixels than SDR images, to be rendered on displays capable of displaying brighter pixels (n.b. for a fixed darkest black, e.g. DB_C=0.1 nit both for the HDR and SDR image, a dynamic range ratio is then simply expressible as a peak brightness PB_C ratio). Correspondingly, the to be rendered maximum display luminance for having the HDR image look optimal may be e.g. 1000 nit, 5000 nit, or 10000 nit. Note that this should not be confused with the prima facie complex concept which will be detailed below, that one can encode such a HDR image or video actually as some SDR image or video to be communicated to receivers, in which case the image is directly renderable on a 100 nit display, but importantly, also contains all information—when having corresponding associated metadata encoding a color transformation for recovering the HDR image—for creating a HDR image with a PB_C of e.g. 1000 nit! Note also that one can recognize HDR images because they will typically not contain many pixels actually achieving the e.g. 5000 nit luminance. Rather, a large proportion of the pixels will actually have more or less the same luminance as in the SDR image, but some pixels, e.g. of specular reflections on metals, but also lights, or also a small region of the sunny outdoors seen through a door of a dark brown pub e.g., will have higher luminances, e.g. around or above 1000 nit. Formulated differently, SDR images will typically have a condensed, largely uniform luminance histogram, and HDR images may have a small spike of bright pixels, far removed from the mode of normal color pixels. Rendering systems will need to take this into account, so that they don't render e.g. a 5000 nit PB_C HDR image on a 100 nit PB_D display. Because that would mean that the darker image areas typically containing of the "normal object" image colors i.e. the semantically important part of the movie story, become nearly black and indiscriminable. The latter aspect of display optimization of a received HDR image, however it was encoded, should not be confused with pure encoding aspects. This complexity has seeped through in many of the aspects of image color handling, and hence has during the previous years and still today led to a run of needed re-thinkings and re-workings of various image handling methods, so that they still work reasonably or optimally in the new HDR image handling ecosystem. In short, HDR image handling has broken open almost everything the last few years, hence also the need for the below solutions. We take the time to elucidate some of the most important needed novel background concepts in the introduction of this application, for getting novices to the HDR technology up to speed.

So a high dynamic range coding of a high dynamic range master image is capable of encoding images with to be rendered luminances of e.g. up to 1000 nit (or more in other HDR image codings), to be able to display-render good quality HDR, with e.g. bright explosions compared to the surrounding rendered scene, or really sunny looking holiday pictures, etc.

In practice, there are scenes in the world which can have very high dynamic range as measurable with a luminance meter (e.g. an indoors capturing with objects as dark as 1 nit or less, whilst simultaneously seeing through the window outside sunlit objects with luminances above 10,000 nit, giving a 10000:1 dynamic range, which is 10× larger than a 1000:1 dynamic range (DR), and even 100 times larger than a 100:1 dynamic range; and e.g. TV viewing may have a DR of less than 30:1 in some typical situations, e.g. daylight viewing).

Since displays are becoming ever better (a couple of times brighter PB_D than 100 nit, with 1000 nit currently being purchasable since approximately one year as a television and from this year even a monitor, and several thousands of nits PB_D being envisaged and already appearing), a goal is to be able to render these images beautifully, and although not exactly identical to the original because of such factors like different viewing conditions, at least very natural, or at least pleasing. And this needs what was missing in the SDR video coding era: a good pragmatic HDR video coding technology to encode how to render those images. The coding should also fulfill as much as possible the many practical needs of the various players in the market, such as cable TV providers, IC makers, content creators, etc.

The reader should also understand that because a viewer is typically watching the content in a different situation (e.g. sitting in a weakly lit living room at night, or in a dark home or cinema theatre, instead of actually standing in the captured bright African landscape, so a bright object could quickly appear too bright in a darker viewing situation), there is no identity between the luminances in the scene and those finally rendered on the TV (or other display). There is even no identity between the relative or normalized luminances, i.e. all the scene luminances divided by some maximum scene luminance, versus also on 0-1 scale the display-rendered luminances divided by PB_D. This can be handled inter alia by having a human color grader manually decide about the optimal colors on the available coding dynamic range C_DR, i.e. of the associated reference display, e.g. by prescribing that the sun in the scene should be rendered in the image at 5000 nit (rather than its actual value of 1 billion nit). This is called a HDR master grading of the content, and obviously how it is actually performed may again depend on various practical factors, such as e.g. whether the content is created as a live stream from a happening. E.g. alternative to human intervention and as far as this application's aspects are concerned, automatic algorithms may do such a conversion from e.g. a raw camera capturing to what in the text will be (generically) called a (master) HDR grading. This means one can then render this master grading on e.g. a 5000 nit PB_D HDR display, at those locations where it is available.

At the same time however, there will for the coming years be a large installed base of people having a legacy SDR display of 100 nit PB_D, or at least some display which cannot make 5000 nit white, e.g. because it is portable (e.g. with a dynamic range with a display peak brightness PB_D=500 nit e.g.), and those people need to be able to somehow see the HDR movie too, and ideally as optimally as possible. So there needs to be some mechanism to convert from a 5000 nit PB_C HDR image to a 100 nit SDR look image of the same scene.

For the convenience of the reader and to get him up to speed quickly on some of the aspects involved, FIG. 1 shows a couple of archetypical illustrative examples of the many possible HDR scenes a HDR system of the future (e.g. connected to a 1000 nit PB_D display) may need to be able to correctly handle, i.e. by rendering the appropriate luminances for all objects/pixels in the image. E.g. ImSCN1 is a sunny outdoors image from a western movie (which has mostly bright areas, which should ideally be rendered somewhat brighter than on a 100 nit display, to offer more a sunny look than a rainy day look), whereas ImSCN2 is a nighttime image.

What makes such an image sunny, versus the other one dark? Not necessarily the relative luminances, at least not in the SDR paradigm. What makes HDR image rendering different from how it always was in the SDR era which ended only a couple of years ago, is that the SDR had such a limited dynamic range (about PB=100 nit, and black level approximately 0.1 to 1 nit), that mostly only the intrinsic reflectivities of the objects could be shown in SDR (which would fall between 90% for good white and 1% for good black). That would be good for recognizing objects (having a certain amount of brightness from their reflection, and of course their chromaticity), under uniform technically controlled illumination, but not so much the beautiful variations in illumination itself one can have in natural scenes, and what impact that can have on viewers. One could make the nighttime image somewhat darker, in the luma histogram, but not too much or it would just render as too dark and ugly an image, and on a 100 nit TV or in a 100 nit encoding there just isn't any room available for anything overly bright. So one had to show the objects independent of their illumination, and couldn't at the same time faithfully show all the sometimes highly contrasty illuminations of the scene that could happen. In practice that meant that the highly bright sunny scene had to be rendered with approximately the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. A conventional solution to that was to color the night scenes blue, so that the viewer would understand he was not looking at a daytime scene. Now of course in real life human vision would also adapt to the available amount of light, but not that much (most people in real life do recognize that it's getting dark, or that they are in a darker, or quite bright environment). So one would like to render the images with all the spectacular local and also temporal lighting effects that one can artistically design in it, to get much more realistic rendered images at least if one has a HDR display available. What exactly would be an appropriate luminance for say a light saber in a dark room we will leave to the color grader creating the master grading(s) to decide, and this application will focus on the needed technical possibilities to create and handle such images.

On the left axis of FIG. 1 are object luminances as one would like to see them in a 5000 nit PB master HDR grading, for a 5000 nit PB_D display (i.e. the grader makes an image assuming the typical high quality HDR TV at home will have 5000 nit PB_D, and he may actually be sitting in a representation of such a home viewing room and grade on such a grading display). If one wants to convey not just an illusion, but a real sense of the cowboy being in a bright sunlit environment, one must specify and render those pixel luminances sufficiently bright (though also not annoyingly too bright, which is a typical pitfall of HDR image creation and handling), around e.g. 500 nit. For the night scene one wants mostly dark luminances, but the main character on the motorcycle should be well-recognizable i.e. not too dark (e.g. around 5 nit), and at the same time there can be pixels of quite high luminance, e.g. of the street lights, e.g. around 3000 nit on a 5000 nit display, or around the peak brightness on any HDR display (e.g. 1000 nit). The third example ImSCN3 shows what is now also possible on HDR displays: one can simultaneously render both very bright and very dark pixels. It shows a dark cave, with a small opening through which one can see the sunny outside. For this scene one may want to make the sunlit objects like the tree somewhat less bright than in a scene which wants to render the impression of a bright sunny landscape, e.g. around 400 nit, which should be more coordinated with the essentially dark character of the inside of the cave. A color grader may want to optimally coordinate the luminances of all objects (already in the PB_HDR=5000 nit master HDR image), so that nothing looks inappropriately dark or bright and the contrast are good, e.g. the person standing in the dark in this cave may be coded in the master HDR graded image around 0.05 nit (assuming HDR renderings will not only be able to render bright highlights, but also dark regions).

Now secondly, one may oftentimes need to have a SDR re-grading for the HDR image, which simplistically one could summarize as follows: whereas on HDR displays which have the capability (or images coded therefore, as a HDR image of e.g. PB_C=5000 nit) one may spread the object luminances all far apart along the large luminance range, to optimally looking luminance positions, on the SDR luminance range one needs to squeeze them together to fit along the smaller luminance range. Still, preferably in such a manner that the SDR image still conveys as much a possible the HDR look, which is why we assume for now that the secondary grading derived from the HDR master grading is also still a master grading made by the color grader, the SDR master grading. I.e. one needs to apply content-dependent optimal luminance mapping functions, also currently described as dynamic metadata. All the corresponding SDR image pixel/object luminances are shown on the right SDR luminance range in FIG. 1. Note that in-between the two graded images, one can also calculate other HDR images with a different coding peak brightness PB_C, which one may also call medium dynamic range (MDR) images (e.g. for 800 nit).

It can be understood that it may not always be a trivial task to map all the object luminances for all these very different types of HDR scene to optimal luminances available in the much smaller SDR dynamic range (DR_1) shown on the right of FIG. 1, which is why preferably a human color grader may be involved for determining the color transformation (which comprises at least a luminance transformation, or luma transformation when equivalently performed on the luma codes; the luminance transformation may in practice consist of several functions formulating technically interesting sub-strategies, but for this application the reader may consider it for simplicity of understanding to be a single function L_out_SDR=F_L(L_in_HDR)). However, one can always choose to use automatically determined transformations, e.g. based on analyzing the color properties of the image content such as its luminance histogram, and this may e.g. be a preferred option for simpler kinds of HDR video, or applications where human grading is less preferred e.g. in real-time content production (in this patent application it is assumed that without limitation grading could also involve the quick setting of a few color transformation function parameters, e.g. for the whole production quickly prior to the start of capturing).

Furthermore, applicant has designed a HDR image and in particular HDR video coding system, which not only can handle the communication (encoding) of merely a single standardized HDR video (e.g. 10 bit perceptual quantizer as EOTF encoded), for a typical single kind of display in the field (e.g. images defined with PB_C=1000 nit, under the assumption that every end viewer having a 1000 nit PB_D display), but which can at the same time communicate and handle the videos which have an optimal look/grading for various possible other display types with various other peak brightnesses in the field, in particular the SDR image for a 100 nit PB_D SDR display. I.e., although in such a HDR video communication system one actually communicates only one type of graded images as transmitted pixelated images, typically though not exclusively in this application SDR images, because of the addition in metadata of functions defining the HDR image pixel colors from those SDR images, one has at the same time communicated HDR image looks for the scene also (without actually needing to communicate them, like in dual image communication, or at least a second layer of pixelated HDR image data).

Encoding only a set of HDR images, i.e. with the correct look i.e. image object luminances for a rendering on say a 1000 nit HDR monitor, in e.g. a 10 bit legacy MPEG HEVC or similar video coding technology is not that difficult. One only needs to establish an optimal luma code allocation function a.k.a. OETF (opto-electronic transfer function) for the new type of image with considerably larger dynamic range, namely one which doesn't show banding in the many compared to white relatively dark regions, and then calculate the luma codes for all pixel/object luminances.

Applicant however designed a system which is able to communicate HDR images actually as SDR images (standard dynamic range by which we mean a legacy Rec. 709 OETF-based encoding referred to a 100 nit PB reference display, and often optimally color graded on such a reference display), which then can already immediately be used for rendering the correctly looking SDR look on legacy 100 nit PB_D SDR displays.

This means that a) the relative luminances of all objects are so determined that they will look correct or at least plausible on a 100 nit PB_D display, and b) that the receiver can assume that the lumas for creating such luminances were defined by the Rec. 709 OETF, which is approximately a square root function.

Thereto, a set of appropriate reversible color transformation functions F_ct is defined, as is illustrated with FIG. 2. FIG. 2 shows non-limitedly a typical system of the SDR-communicating type, for the purpose of explaining the basic concepts. These functions may be defined by a human color grader, to get a reasonably looking SDR image (ImLDR) corresponding to the HDR master image MAST_HDR, whilst at the same time ensuring that by using the inverse functions IF_ct the original master HDR (MAST_HDR) image can be reconstructed with sufficient accuracy as a reconstructed HDR image (Im_RHDR), or, automatic analysis algorithms may be used at the content creation side for determining suitable such color transformation functions F_ct. The IF_ct functions can be determined from the forward, HDR-to-SDR mapping F_ct functions as communicated, or, the system may even directly communicate the IF_ct function(s).

The color transformer 202 typically applies the F_ct luminance mapping of the relative luminances of the master HDR image (MAST_HDR) pixels, i.e. normalized so that the maximum luminance is 1.0. For understanding the present invention's concepts, one may for simplicity assume it uses a $4^{th}$ power luminance mapping function for deriving the normalized SDR output luminances of the pixels of the 100 nit PB_C SDR output image Im_LDR (i.e. the right side of FIG. 1), i.e. that such a function gives a reasonable look for the SDR graded corresponding images to the master HDR image of the scene (reasonable meaning for the particular scene such aspects like that a large percentage of the shadowy areas will not look to dark, lamps and other luminous objects will pop as desired by virtue of them having still a reasonable inter-region contrast with the darker image regions even in the SDR image, at least as far as the SDR luminance dynamic range allows, etc.; for other images other factors may contribute, but such details are not essential nor limiting for elucidating the technical components of the present invention). Since the receivers must be able to reconstruct the master HDR image from the received corresponding SDR image, or at least a close reconstruction but for some compression-related artefacts, apart from the actual pixelated images also the color mapping functions must enter the video encoder 203. Without limitation, we may assume that the video is compressed with a MPEG HEVC video compressor, and the functions are stored in metadata, e.g. by means of the SEI mechanism or a similar technique.

So after the action of the content creating apparatus 221, from the image communication technology perspective, the video encoder 203 pretends it gets a normal SDR image as input, and more importantly: outputs what is technically a SDR image. So the further technology, e.g. a transmission formatter 204 applies all the necessary transformations to format the data to go over some transmission medium 205 can just apply all the typical steps it used to perform in the SDR coding paradigm. E.g. transformation to a codification of wave elements at higher frequency for network or airwaves communication may be performed, or the data may be converted into pits for a BD disk etc.

Subsequently the image data travel over some transmission medium 205, e.g. a satellite or cable or internet transmission, e.g. according to ATSC 3.0, or DVB, or whatever video signal communication principle, to one or more receiving side(s).

At any consumer or professional side, a receiver 206, which may be incorporated in various physical apparatuses like e.g. a settopbox, television or computer, undoes the channel encoding by applying unformatting and channel decoding. Then a video decoder 207 applies e.g. HEVC decoding, to yield a decoded SDR image Im_RLDR, and the color transformation function metadata F_ct. Then a color transformer 208 is arranged to transform the SDR image to an image of any non-SDR dynamic range. E.g. the 5000 nit original master image Im_RHDR may be reconstructed by applying the inverse color transformations IF_ct of the color transformations F_ct used at the encoding side to make the Im_LDR from the MAST_HDR. Or, a display tuning unit 209 may be comprised which transforms the SDR image Im_RLDR to a different dynamic range, e.g. Im3000 nit being optimally graded in case display 210 is a 3000 nit PB display, or a 1500 nit or 1000 nit PB image, etc. We have non-limitingly assumed the video decoder and color transformer to be in a single video redetermination apparatus 220.

This system would work perfectly if one needs to make HDR to and from SDR color transformations, i.e. automatically determine re-graded images in a receiver, which happen in the same color space, with the same color primaries, e.g. both the master HDR image and the SDR image are defined according to Rec. 709 EBU RGB primaries of legacy SDR television. The luminance aspects of HDR versus SDR are then handled. However, color is a three-dimensional quantity. That means that in addition to brighter pixel colors (i.e. higher absolute pixel luminance), there exists another color property, namely the higher saturation of so-called wide gamut images, which in principle has nothing to do with HDR per se (wide gamut was developed independently as a possible quality improvement for SDR TVs), however, it was thrown into the mix, since the deciding parties figured that if we were going to improve the technology for higher luminances and dynamic range, we might as well make systems which also have spectacularly saturated colors. Apart from a business desire, that doesn't mean however that this is technically easily done, since color gamuts have complex shapes, making the chromatic color direction processing different, and, intricately interweaved with the luminance processing even. So solutions have to be found.

FIG. 3 schematically shows the issues. The master HDR images may have been made extra colorful, i.e. in a HDR color gamut GAM_H with saturated RGB primaries. E.g., Rec. 2020 is such a saturated color gamut, and a preferred gamut for mastering HDR movies. However, one may desire that the images to be communicated are encoded in the smaller SDR color gamut GAM_S, with Rec. 709 colorimetry, because legacy TVs (which are absolutely HDR ignorant, i.e. they use the HEVC decompressed SDR images as is, without further colorimetric processing) expect such colors. I.e., whereas obviously the larger GAM_H can comprise colors outside the smaller GAM_S gamut, what is communicated must all be colors in the smaller GAM_S. In the chromaticity (bottom) plane, we see the gamut triangle demarcated respectively by the SDR red green and blue primaries (Rs, Gs, Bs), and the HDR primaries (Rw, Gw, Bw), which are more saturated, ergo, more saturated colors can be made. And since in 3D the shapes are complex, the relationships can be tricky, in particular for some scenes. We see that we not only have a problem for colors which are too bright (color Col1), and need typical HDR-to-SDR luminance mapping. But also even in the ground plane, there can be dark colors, which cannot be treated by such a luminance mapping. Colors like Col2 should stay dark, but they are to saturated (saturation being the distance from the axis of neutrals, which in this example is assumed to have a same HDR white (WH) and SDR white (WS) chromaticity falling on that axis). So something else has to be done.

There exist several prior art gamut mapping techniques, but those were all designed from an end-point point of view, i.e. where the receiver had a wide gamut image (and usually an SDR image, because one oftentimes tends to avoid mixing gamut mapping issues with HDR-to-SDR mapping issues) and unidirectionally mapped to a smaller gamut, i.e. bringing the colors inside GAM_S. But these methods didn't need to take into account reversibility, because no SDR image was communicated, to be re-graded (/reconstructed) into a HDR image at the receiver side (i.e. not just with brighter colors, but also having its original wide gamut saturated color chromaticities restored). I.e. there is a need for a simple pragmatic gamut mapping which can be integrated into SDR-image communicating HDR video coding technologies.

US20170064334 is an example of techniques that can be used to communicate a HDR image as an SDR image, plus information which allows receivers to calculate a HDR image reconstruction from the received SDR image by applying a color volume transform, which is a technique to map the colors in the received SDR image color gamut to corresponding HDR color gamut colors. Although this prior application mentions that the HDR color gamut can also be chromatically wider than the SDR gamut, the teachings focus mostly on the required luminance remapping. To be clear that technical differences are fully understood, we elucidate the situation with FIG. 9. Here we assume we have the general problem of determining corresponding colors between a smaller SDR color gamut 901 (the colors being natively represented as linear RGB color components luminances, but similar techniques can at least in principle be specified in other color representations) and a larger HDR color gamut of specifiable colors 902. The task is to determine for an incoming SDR color (Rs, Gs, Bs), a corresponding HDR color. E.g., if the goal is to exactly render all SDR colors on the HDR display as they would look on the SDR display, such a task is mathematically easily doable because the HDR gamut is the larger gamut. One may initially interpret the SDR color as a HDR color, by equating Rh=Rs, Gh=Gs, Bh=Bs. Displaying such large HDR color components will of course show colors that are much brighter than the SDR colors, because e.g. driving a 10× as bright display as the SDR display to its maximum (Rh luma code=e.g. 1023) will yield a brighter red partial color component than on the SDR display. We hence need to apply a color volume transform to the intermediate color(s) ClimH, and hence their three RGB components, to obtain the correct RGB display driving values, and the mapped color CLH. In case the HDR display is 10× brighter than the SDR colors which need to be simulated on it, one can readily understand that the mapping must be Rh_CLH=Rh_ClimH/10=Rs/10; Gh_CLH=Gs/10; Bh_CLH=Bs/10. This is the scaling factor approach mentioned in [0030]. In general, a simple linear volume transform would use a 3×3 matrix. The most generic and powerful color volume transform is the 3D-LUT mentioned in [0036]. We have illustrate that principle in our FIG. 9 with the square colors. One may have complex desiderata to map a HDR color CLinH to a corresponding SDR color LUT[CLinH]. With a 3D LUT, which is a list of triplets for each possible input color RGB triplet, one can define whatever wild color volume transform behavior one desires: (Ro,Go,Bo)=F_RiGiBi[Ri,G,Bi], with the F_RiGiBi variation indicating to whichever desired output values (Ro,Go, Bo) can be associated with each input triplet, because the LUT is just a big storage of these relationships.

It is important to understand that when having such a powerful color volume transform, it can "solve all color mapping problems" in one step, ergo whichever color volume transform approach one would select based on the prior art, one would typically solve any issues regarding saturation of the colors together with doing the luminance remapping between the HDR and SDR image. Things become quite different, and typically more complex when having a system which decouples the luminance processing from the chromatic processing. And furthermore, we wanted to design a reversible gamut mapping which can easily be combined with already existing at least luminance processing (e.g. as preprocessing unit 403 and postprocessing unit 425 in FIG. 4).

SUMMARY OF THE INVENTION

To enable both a high quality HDR video reconstruction by a HDR decoder and good quality SDR video communication, for systems which communicate a pair of such graded images of a HDR scene, by actually communicating one of those images in particular the SDR image, the present patent application teaches a method of converting a high dynamic range image (HDR_2020) comprising a pixel having a first color (C_in) having a first color saturation, into a standard dynamic range image (SDR_709) having a peak luminance of 100 nit, in which that pixel has a second color (C_out) having a second color saturation which is lower than the first color saturation, the converting comprising:

performing a color space conversion (601) comprising applying a color matrix which maps a first RGB representation of the first color defined according to first red, green and blue primaries to a second RGB representation (RGB_sec) of that pixel color according to second red, green and blue primaries wherein the second red, green and blue primaries encompass a smaller color triangle than the first red, green and blue primaries, yielding an intermediate image (HDR_IM);

applying a reversible gamut mapping to the second RGB representation (RGB_sec), yielding a mapped color (C_map); and applying a luminance mapping (TOM) to the luminance of the mapped color, to obtain the low dynamic range image (SDR_709) with the pixel having an output color (C_out) which has a luminance (L_Out) different than the luminance of the mapped color, and outputting the standard dynamic range image (SDR_709), characterized in that the reversible gamut mapping comprises applying a respective mapping function (F1, F2, F3) to each of the three R, G, and B color components of the second RGB representation to respectively obtain output R, G, and B color components (Ro, Go, Bo) which define the mapped color, which respective three mapping functions comprise two linear segments (501, 502), of which one of the segments (501) corresponds to an identity transform which segment begins at a respective threshold value (TP_red, TP_green, TP_blue) of respectively the input red, green or blue color component of the second RGB representation, and the second linear segment goes from the respective threshold value (TP_red, TP_green, TP_blue) to a respective minimal value (minP_red, minP_green, minP_blue) which is the most negative value occurring in the intermediate image (HDR_IM) for the respective component of the second RGB representation, and wherein the respective threshold value is calculated by multiplying the values of the two components of the second RGB representation other than the color component for which the respective threshold value is calculated by respective constants (kRG, kRB) in case such values of the two components are larger than zero, and summing those two multiplied contributions: TP_red=kRG*max(0,G_in)+kRB*max(0, B_in); TP_green=kGR*max(0,R_in)+kGB*max(0, B_in); TP_blue=kBR*max(0,R_in)+kBG*max(0, G_in). This provides a simple, i.e. easily reversible, yet powerful well-working manner of doing a reversible gamut mapping coordinating well with the needs of dynamic range conversion (ergo at the encoder one maps from the larger HDR color triangle to the smaller SDR color triangle on which the dynamic range processing and image communication occurs, and at the decoder one can reversibly map from the smaller color triangle-defined colors to the original more saturated reconstructed HDR colors; and the luminance mapping works in the achromatic direction), in particular where the actually communicated image needs to be a standard dynamic range image (i.e. in a standard manner with having all its colors defined to have a luminance of maximally 100 nit, the so-called coding peak brightness PB_C, and all lower pixel luminances so defined—in fact calculated from the HDR luminances with a suitably-shaped luminance mapping function TOM—so that the object luminances in the SDR image still seem reasonably similar to the HDR image object luminances as far as possible when displayed on a SDR display) which is defined in a narrower color gamut having at its base a smaller chromaticity triangle, which would typically be defined with Rec. 709 primaries, as those are the usual video primaries, and are the video primaries which were used for video encoding in the SDR video era which SDR video coding was the video coding used until recently. A core element of our reversible gamut mapping is the establishment of the TP thresholds, and at least some embodiments may establish a reasonably working value for at least one of the angles cP of the lower segment of the bilinear mapping curve which needs to correct for negative RGB-values, or some receivers may e.g. establish the lowest negative value minP for at least one of the three RGB components at their end (however other embodiments may establish the optimal function-defining parameter values at their end, and communicate them as metadata to be directly used in decoders). And in particular, the TP values can be calculated for different colors and the magnitudes of their color components based on k-factors, which may be communicated or established by the decoder.

So with all this technology in place, i.e. by communicating all the necessary mapping function data (e.g. the luminance mapping may be communicated as a LUT, but also a number of parameters which define the function shape; and as one can read below the gamut mapping three functions are easily communicated with 3×2 parameters (6C), and typically also at least one angle cP which defines how fast the lower segment of the bi-linear mapping curve for each of the RGB color components rises to the respective threshold point, e.g. TP_red, starting from the respective minimum value in this image for the respective color component of the input color e.g. minP_red being allocated a zero output component, or y-axis value in FIG. 5A) in addition to the SDR images which were generated at the encoding site corresponding to the master HDR image, any receiver can accurately reconstruct the HDR images from the received SDR images.

Firstly by the use of the identity segment, most of the colors typically occurring in the images (somewhat less saturated colors which can be faithfully represented in both color gamuts, i.e. the wider one of the HDR image and also the one of the actually communicated SDR image) will be unchanged, and only for the few highly saturated colors small changes can occur, due to quantization of the coding of the colors which are squeezed into the SDR gamut by the lesser slope segment. But that will hardly be an important or even noticeable issue, because the dominant factor is that the wider gamut HDR colors are reconstructed to their saturated color positions, approximately.

Important is also that these three function shapes can be optimized, i.e. their 3×2 defining k-parameters can e.g. be determined optimally at the encoding side for the color-specifics of the present image or shot of successive images, and communicated as metadata to receivers. The optimal thresholds for a color component (e.g. TP_red) is according to this invention best determined by adding two weighted contributions of the other two color components: TP_red=kRG*max(0,G_in)+kRB*max(0, B_in), where G_in and B_in are the green respectively blue component of the input color, i.e. the second RGB representation (typically though not exclusively with linear red, green and blue components). The max operator makes sure that the two partial contributions of the two other color components are non-negative. The kRG e.g. gives then as we will see below a contribution of a shift of the red in a green direction. Ergo, this gives a simple yet powerful manner to tune the bilinear R, G, and B component mapping functions of the gamut mapping to the actual total RGB value of a color, rather than to have single mapping functions for whatever the RGB color happens to be (which will give the desirable property of luminance independency to this gamut mapping). The fact that the encoder can determine and communicate in such a manner optimal values of the 6 k-parameters hence optimal gamut mapping function shapes is important. Because these shapes need not be determined necessarily on a worst case scenario, but can actually be tuned to the situation, namely the actual colors present in an image or temporal sequence of images. E.g. a color space conversion from Rec. 2020 to Rec. 709 could yield considerably low negative values (or in other words high absolute values for such negative numbers, which largest one we defined as the most negative value), but only in case these very saturated colors, close to the Rec. 2020 boundary are actually present in the image(s). And often such highly saturated colors are not present in natural images, or maybe only for a few pixels. If there are only colors present in the image(s) which are just a little outside the smaller Rec. 709 gamut, then only small negative numbers will occur after the color space conversion, and we can use a mapping function (for that color component) which has a low value of TP (because not much room needs to be freed for mapping negative values of that color component to positive ones).

Where we illustrate the principle with a single example of mapping Rec. 2020 defined HDR images to Rec. 709 SDR images, obviously the same reversible gamut mapping optimized for the HDR codec can be applied on other gamuts of either images, e.g. DCP-P3 primaries for the HDR image, etc.

The inventor actually realized from his experimental studies that one can also determine for a fixed primaries system, the kRG, kRB etc. coefficients from colorimetric equations, however, because the actual gamut of available colors in a specific image or image sequence can be (much) smaller than the totality of colors the e.g. Rec. 2020 container allows for (i.e. the "worse" possible case for mapping to a smaller gamut, of the most saturated colors that can be represented in the larger gamut coinciding with the full Rec. 2020 color representation gamut), the communication of (at least) the 6 kXX values elegantly realizes the specification of the variable optimal gamut mapping for the receiving side HDR image decoding apparatuses.

It is advantageous if the method is defined in such a manner that the three mapping functions (F1, F2, F3) have a different value of their angle (cP) of direction measured from the horizontal axis (i.e the input axis of the graph defining the respective output red, green or blue color component from its input color component value of the intermediate color representation) of the second one of the two linear segments (502) defining said respective functions. Note that although in FIG. 5A we specify the angle downwards from the dashed horizontal line through TP, because of the laws of trigonometry this is equal to the upwards angle of the second segment 502 from the x-axis at minP. So the red curve is defined by TP_red and cP_red, the green curve by TP_green and cP_green, and the blue curve by TP_blue and cP_blue. It works already quite well if one (as in the above more general principle) defines only the 3 variable image-optimized TP values, via actually communicating 6 kXX values as described below, and assumes that the angle of the lower linear segment of the mapping (502) is fixed (known by receivers), e.g. 0.25 yielding good quality reconstructability of the highly saturated colors in the wider color gamut of the HDR reconstructed image at a decoder. Ergo, various embodiments can be designed which use a single value cP for the three curves, or at least not three different values (e.g. some of the values could be optimized and others fixed, to be as large to always work, or to be established by receivers). However, for ultimate precision, it may be useful if an encoder (and consequently decoder) can use variable lower segments too, with variable angle cP mapping potentially large negative color component values to all positive color component values (upon which subsequently then a reversible luminance mapping can be applied). In a more general case 9 coefficients may be communicated, namely the 6 kXX values and 3 angle values cP_red, cP_green and cP_blue. Or, a single cP value may be communicated which is different from the pre-agreed default value (typically 0.25), yet the same for the three color components, but better than 0.25 for the present image content situation, leading to only 7 parameters being communicated instead of 9. E.g. some images may undergo somewhat stronger color compression in the SDR image without giving visually problematic results, leading to an encoder-determined choice of e.g. cP=⅛. This all depends on what kind of saturated colors exist in the image (and typically in which image object, e.g. an unimportant TL tube in a small area in the back of the imaged scene, versus an important highly saturated object), and also depending on what in practice the content creator may judge permissable as a HDR image reconstruction error. In offline encoding this may be verified by a human, and in real-time encoders image analysis methods may be used which calculate some penalty of smaller cP values by a function taking into account e.g. the amount of highly saturated colors, how they contrast with other colors (e.g. how much brighter and or saturated they are than the other colors in the image or the average color, etc.), or how they contrast with colors spatially surrounding the problematic highly saturated out-of-gamut colors for the Rec. 709 gamut, etc. Such functions may be optimized on a collecting of typical HDR images, and then select between cP=e.g. ⅓, ¼, or ⅙ or ⅛ depending on how they judge the image color composition situation, and the consequent visual impact of a cP determination, typically at least on the HDR image reconstruction quality, but in some HDR image communication system constructions also on the visual quality of the SDR image.

In both situations, the mathematics guarantees that the lower segment ends at an x-coordinate being the minP value of that color component (e.g. P=Red), typically being the most negative (i.e. with the highest absolute value) value for that component which occurs in the data set of pixel colors of the image or temporal set of images actually being processed, i.e. the actual image gamut (note that in general under the same principle the encoder may decide to use any pragmatically well-working value of minP, e.g. which is slightly higher [i.e. smaller absolute value, or more towards zero] than the actual most negative value, which would yield a small amount of clipping of the very most saturated colors to the same color in the SDR and HDR image), and an y-coordinate, or output of the respective color component for that most negative value, of zero. An encoder can detect this by analyzing the image in various manners, e.g. on can subsample the present colors instead of checking all of them, use or verify some typical test colors, like a saturated cyan, etc., which are embodiments beyond the basic principle of the (de)coding apparatuses/methods. Note that finding a minP value in the color space converted image to the color primary basis of the smaller gamut (typically Rec. 709 SDR) is equivalent to an analysis of the original HDR image colors because of the fixed matrix relationship, but in the intermediate color space converted image the analysis is pragmatically the easiest, because there the negative color component values occur, outside the narrower triangle. So the respective minP_red, minP_green and minP_blue smallest values that occur in the present one or more images for which the optimized gamut mapping applies need not be communicated, but can be determined uniquely at the receiving side by starting to extend the second linear segment 502 downwards from the identity transform at the respective threshold point, e.g. TP_red, with the appropriate angle, e.g. cP_red, and good values for the parameters as communicated and received will guarantee that one can correctly gamut map all colors occurring in the image to be processed, up to that color having the smallest e.g. red color component minP_red.

Advantageously the low dynamic range image has its colors defined according to Rec. 709 primaries.

Advantageously the high dynamic range image has its colors defined according to wide gamut primaries, such as e.g. cinematic primaries (e.g. DCI-P3), or Rec. 2020 primaries (the full definition of the Rec. 2020 standard is: Recommendation ITU-R BT.2020 Parameter values for ultrahigh definition television systems for production and international programme exchange August 2012; p. 3 table 3 system colorimetry).

The primaries are x_red=0.708; y_red=0.292; x_green=0.170; y_green=0.797; x_blue=0.131; y_blue=0.046. But the wide gamut triangle need not necessarily be the actual theoretical color space (e.g. Rec. 2020) primaries triangle, but can be a triangle around the actual colors present in the image, which need not actually be determined (i.e. need not be communicated as e.g. a mathematical parameterization of their enveloping shape), but is immediately realized by the below gamut mapping algorithm, i.e. by the determining and communicating the most suitable kXX values.

From this by applying elementary linear colorimetry, the coefficients of the 3×3 matrix for converting any color to that color when represented in the Rec. 709 RGB primaries system can be calculated.

Advantageous is a high dynamic range image encoder (401) arranged to encode an input high dynamic range image as a standard dynamic range image (SDR_comm) together with color mapping function data (TOM, 6C), the encoder (401) comprising:

a color space convertor (402) arranged to apply a matrix conversion from a color of a pixel of the high dynamic range image defined as a first RGB representation defined according to first red, green and blue primaries to a second RGB representation (RGB_sec) of the color of that pixel according to second red, green and blue primaries which have at least one less saturated primary than the corresponding primary of the first primaries and consequently define a smaller chromaticity triangle, and arranged to output the resulting second RGB representation of the color of the pixel in an intermediate high dynamic range image (HDR_IM);

a gamut mapper (403), arranged to apply a reversible gamut mapping to the color of the pixel, and output a color mapped high dynamic range image (HDR_709) in which the pixel has a less saturated color; and a luminance mapper (603) arranged to apply a luminance mapping function (TOM) to the luminance of the color of the pixel in the color mapped high dynamic range image (HDR_709), to obtain an output color (C_out) having an output luminance (L_out) for that pixel which is different from the luminance, and arranged to output the output color (C_out) in a standard dynamic range output image (SDR_709), which has a peak brightness of 100 nit, characterized in that the gamut mapper is arranged to apply a gamut mapping algorithm which comprises applying three respective mapping curves (F1,F2,F3) to the three respective red, green and blue color components of the second RGB representation (RGB_sec) to obtain output RGB color components (Ro, Go, Bo), which respective three mapping functions comprise two linear segments (501, 502), of which one of the segments (501) corresponds to an identity transform which segment begins at a respective threshold value (TP_red, TP_green, TP_blue) of respectively the input red, green or blue color component of the second RGB representation, and the second linear segment (502) which maps between the respective threshold value (TP_red, TP_green, TP_blue) and a respective minimal value (minP_red, minP_green, minP_blue) which is the most negative value occurring in the intermediate image (HDR_IM) for the respective component of the second RGB representation, and wherein the respective threshold value (TP_red, TP_green, TP_blue) is calculated by multiplying each of the two components of the second RGB representation other than the color component for which the threshold value is calculated by a respective constant (kRG, kRB) in case the value of said respective one of the two components is larger than zero, and summing those two multiplied contributions:
TP_red=kRG*max(0,G_in)+kRB*max(0, B_in);
TP_green=kGR*max(0,R_in)+kGB*max(0, B_in);
TP_blue=kBR*max(0,R_in)+kBG*max(0, G_in).

Again the 3 functions of the reversible gamut mapping may be using the same cP value or different cP values.

Advantageous is a high dynamic range image encoder (401) as claimed in one of the above claims, having its color space convertor (402) and gamut mapper (403) configured to encode an input high dynamic range image defined in a color space defined by Rec. 2020 color primaries, as a standard dynamic range image having its pixel colors defined in a color space defined by Rec. 709 color primaries.

Corresponding to this particular manner(s) of HDR image encoding, at a receiving side (e.g. in a Settopbox, TV, computer, professional cinema system, etc.) there can be a mirroring method of decoding a high dynamic range image (RCHDR_2020), which is input encoded as a standard dynamic range image (SDR_comm, SDR_709) encoded in a color space with a less saturated chromaticity of at least one of the RGB primaries than the corresponding primary in which the high dynamic range is decoded, comprising:
applying a luminance mapping defined as a received luminance mapping function (TOM) to the luminance of a color of a pixel of the standard dynamic range image to obtain a HDR color (C_H) for the pixel, which has a luminance (L_H) which is different from the luminance, and which pixel color is stored in a first intermediate high dynamic range image (IM_FH);

applying a gamut mapping with functions which are the inverse of the gamut mapping which was applied by an encoder which derived the standard dynamic range image from a high dynamic range image (HDR_2020), and for which data defining the shape of the functions (6C) has been received, yielding a gamut remapped image (IM_GRM); and applying a color space conversion to the colors of the pixels of the gamut remapped image (IM_GRM), which comprises applying a matrix for transforming the colors represented as a first RGB color representation of the standard dynamic range image defined with a first set of red, green and blue primaries, to a second RGB color representation of the high dynamic range image (RCHDR_2020), defined with a second set of red, green and blue primaries, of which at least one primary is more saturated than the corresponding primary in the first set of RGB primaries, and outputting the high dynamic range image (RCHDR_2020);

characterized in that the gamut mapping comprises applying three respective mapping functions (IF1) on the respective RGB color components of the HDR color (C_H) to obtain mapped RGB color components of a mapped color (C_M), which mapping functions comprise two linear segments, of which one of the segments (504) corresponds to an identity transform which segment begins at a respective threshold value (TP_red, TP_green, TP_blue) of respectively the input red, green or blue color component of the second RGB representation, and the second linear segment (503) maps to a respective most negative value (minP_red, minP_green, minP_blue) of the respective color component of the mapped RGB color components in case the respective input color component of the RGB color components of the HDR color (C_H) is zero, which most negative value is substantially equal to the most negative value of that color component in the RGB color representation for the original high dynamic range image (HDR_2020) of which the standard dynamic range image is an encoding, and wherein the respective threshold value is calculated by multiplying the values of the two components of the second RGB representation other than the color component for which the threshold value (TP) is calculated by respective constants (kRG, kRB) in case such a value is larger than zero, and summing those two multiplied contributions: TP_red=kRG*max(0, G_in)+kRB*max(0, B_in); TP_green=kGR*max(0,R_in)+ kGB*max(0, B_in); TP_blue=kBR*max(0,R_in)+ kBG*max(0, G_in).

The difference is that now the three respective color component mapping functions of the gamut mapping functions will have the inverse shape (i.e. instead of mapping RGB component values which can be negative to all positive values, they will reconstruct approximately perfectly the original negative values, which occurred when at the encoding side the still wide color HDR image was merely RGB color representation converted, i.e. before the gamut mapping. Via the gamut mapping, certain negative values correspond to certain color saturations in the chromaticity plane, i.e. distances from the boundary of the e.g. Rec. 709 triangle.

And secondly, to be able to reconstruct the original highly saturated HDR pixel colors from the pixel colors in the SDR image as received, the decoder needs to know exactly which reversible gamut mapping functions were applied by the encoder, to be able to determine the correctly shaped two-segment color component re-mapping functions (as elucidated in FIG. 5B).

Ergo, it typically has to receive the data being typically the 6 parameters (6C) describing those functions. Those parameters will be at least the six kXX values to be able to determine at the receiving side the three TP values, but can also be further parameters, in particular characterizing the angle of the linear segment which realizes the color compressive behavior into the narrower gamut. Also one (cP) or more (typically cP_red, cP_green, and cP_blue) values for the angle of the second segment of the RGB component mapping functions may be communicated between the encoder of the image(s) and a receiver, via any metadata mechanism associated or associatable with the images, which the decoder can read before applying the inverted gamut mapping to the chromatically larger color representation.

Advantageously a method of decoding a high dynamic range image has the respective three angles (cP_red, cP_green, cP_blue) of the non-identity linear segment (503) of the color component mapping function for the respective one of the three RGB color components being different.

Advantageously, decoders (or decoding methods) may also establish well-working k-values by themselves, and the encoder can via a gamut mapping type indicator indicate he will rely on the application of such a mechanism, e.g. an embodiment of method of decoding a high dynamic range image calculates the respective constants for multiplication on the basis of matrix coefficients defining the relationship between the RGB values of any color as represented in the first RGB color representation of the standard dynamic range image and the RGB values of said any color as represented as the second RGB color representation of the high dynamic range image according to: kRG=(cRG/cRR)*cP_red/(1.0-cP_red), kRB=(cRB/cRR)*cP_red/(1.0-cP_red), kGR=(cGR/cGG)*cP_green/(1.0-cP_green), kGB=(cGB/cGG)*cP_green/(1.0-cP_green), kBR=(cBR/cBB)*cP_blue/(1.0-cP_blue), kBG=(cBG/cBB)*cP_blue/(1.0-cP_blue), in which the cXX coefficients are the said matrix coefficients, and the respective cP_X values are the angles, which may be the same for the three RGB color components or different. Once one knows the color primaries of the communicated and needed (to be reconstructed) image, coefficients like cRG are known, because they are fixed by the chromaticities of the used primaries which define both color representations. Typically this information is statically communicated with metadata, which specifies with some indicator value that the received image is legacy SDR (i.e. which uses the standardized Rec. 709 color primaries), and that the received functions are to be used for reconstructing a corresponding e.g. Rec. 2020 HDR image from the communicated and received SDR image. The one or more cP values may in various embodiments be prefixed in the decoders, or established e.g. by image analysis, or received as metadata communicated by the image encoder.

Advantageously a method of decoding a high dynamic range image has the standard dynamic range image (SDR_comm, SDR_709) defined in a color space defined with Rec. 709 RGB color primaries. The HDR image may advantageously be defined according to e.g. Rec. 2020 RGB color primaries.

Advantageously a high dynamic range image video decoder is arranged to decode a high dynamic range image (RCHDR) from an input standard dynamic range image (SDR_comm, SDR_709) which encodes the high dynamic range image and which is encoded in a color space with a less saturated chromaticity of at least one of the RGB primaries than the corresponding primary in which the high dynamic range is decoded, comprising:
  a luminance mapper arranged to obtain a received luminance mapping function (TOM) and apply it to the luminance of a color of a pixel of the standard dynamic range image to obtain a HDR color (C_H) for the pixel, which has a luminance (L_H) which is different from the luminance, and which HDR color is stored in a first intermediate high dynamic range image (IM_FH);
  a gamut mapper arranged to apply with color mapping functions which perform the inverse of the gamut mapping which was applied at an encoding site where the standard dynamic range image was derived from a high dynamic range image (HDR_2020), and for which data defining the shape of the color mapping functions (6C) has been received, yielding a gamut remapped image (IM_GRM); and
  a color space convertor arranged to apply to the colors of the pixels of the gamut remapped image (IM_GRM) a color conversion which comprises applying a matrix for transforming the colors represented as a first RGB color representation of the standard dynamic range image defined with a first set of RGB primaries, to a second RGB color representation of the high dynamic range image (RCHDR_2020), defined with a second set of RGB primaries, of which at least one primary is more saturated than the corresponding primary in the first set of RGB primaries, and
  outputting the high dynamic range image (RCHDR_2020), characterized in that the gamut mapper is arranged to apply three respective mapping functions (IF1) to the respective RGB color components of the HDR color (C_H) to obtain mapped RGB color components of a mapped color (C_M), which mapping functions comprise two linear segments, of which one of the segments (504) corresponds to an identity transform which segment begins at a respective threshold value (TP_red, TP_green, TP_blue) of respectively the input red, green or blue color component of the second RGB representation, and the second linear segment (503) having a respective angle (cP_red, cP_green, cP_blue) defined starting from the vertical direction which maps a zero input value to a negative value of the respective color component of the mapped RGB color components which is substantially equal to the most negative value of that color component in that RGB color representation occurring in the original high dynamic range image for which the standard dynamic range image is an encoding, and wherein the respective threshold value (TP_red, TP_green, TP_blue) is calculated by multiplying the values of the two components of the second RGB representation other than the color component for which the respective threshold value is calculated by respective constants (kRG, kRB) in case said color component has a value larger than zero, and summing those two multiplied contributions: TP_red=kRG*max(0, G_in)+kRB*max(0, B_in); TP_green=kGR*max(0,R_in)+kGB*max(0, B_in); TP_blue=kBR*max(0,R_in)+kBG*max(0, G_in).

Decoders may use one or more cP values, which may be established at the decoder, or preferably read from metadata co-communicated with the images.

Advantageously is also a high dynamic range image video decoder, in which the gamut mapper is arranged to apply the three color mapping functions on the respective one of the three RGB color components, which respective functions have a different value for their respective angles (cP) of the linear segment which is not implementing an identity transform.

Advantageously is also a high dynamic range image video decoder in which the gamut mapper and the color space convertor are arranged to decode the high dynamic range image from a standard dynamic range image which is defined according to Rec. 709 RGB primaries.

The present new technical ideas may be embodied in various forms, such as connected systems, partial services on remote locations which may be communicated over generic or dedicated networks, a computer program product comprising code which when run on a processor enables the processor to perform all methods steps of one of the above method claims, any video signal codification comprising the various needed metadata which needs to be coordinately communicated between encoder/transmitter and decoder/receiver, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions (and how they may be shown on a display).

In the drawings.

DETAILED DESCRIPTION OF THE EMBODIMENTS

Figure 1:
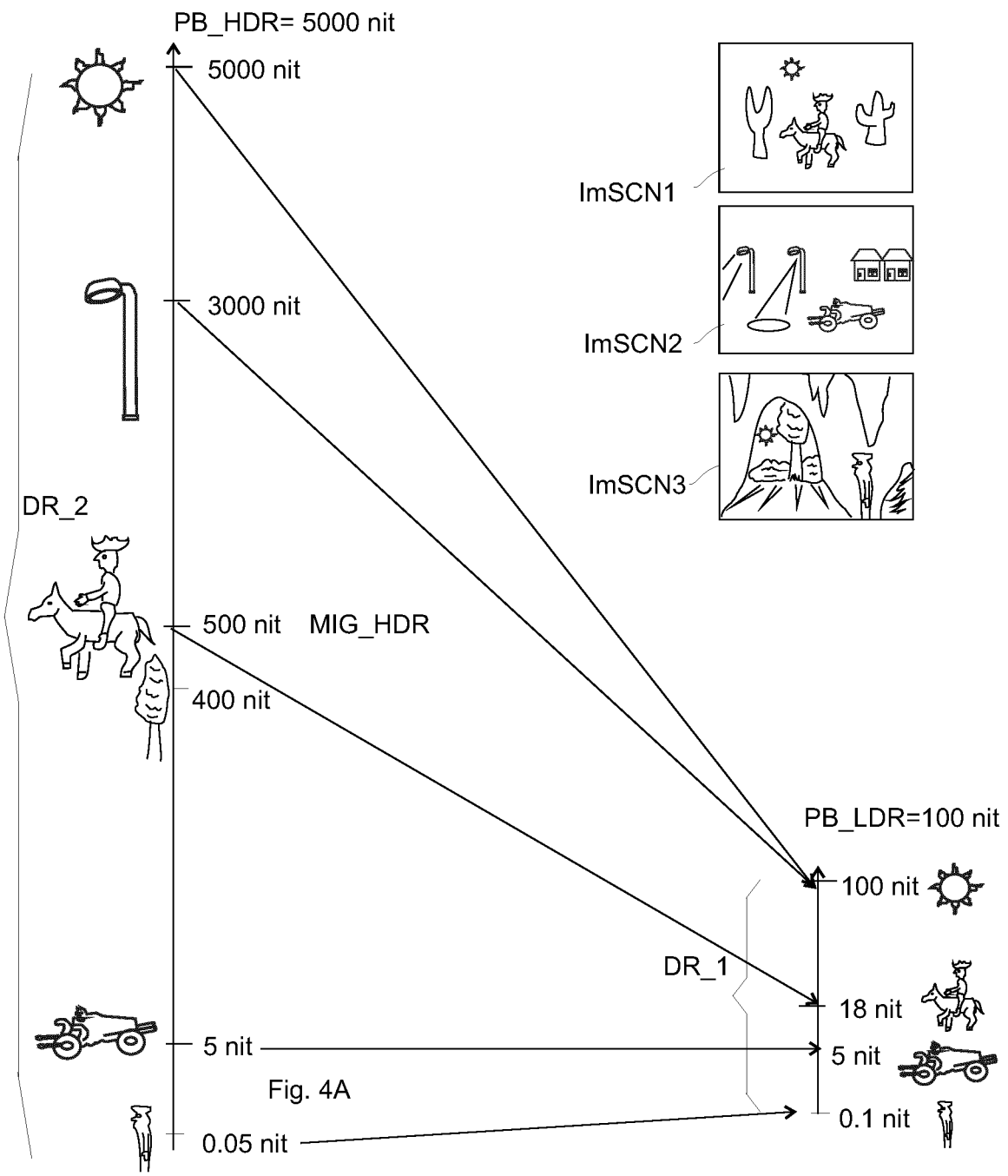
FIG. 1 schematically illustrates a number of typical color transformations which occur when one optimally maps a high dynamic range image to a corresponding optimally color graded and similarly looking (as similar as desired and feasible given the differences in the first and second dynamic ranges DR_1 resp. DR_2) low or more precisely standard dynamic range image, which in case of reversibility would also correspond to a mapping of an SDR image coding the HDR scene, to a reconstructed HDR image of that scene.
Figure 2:
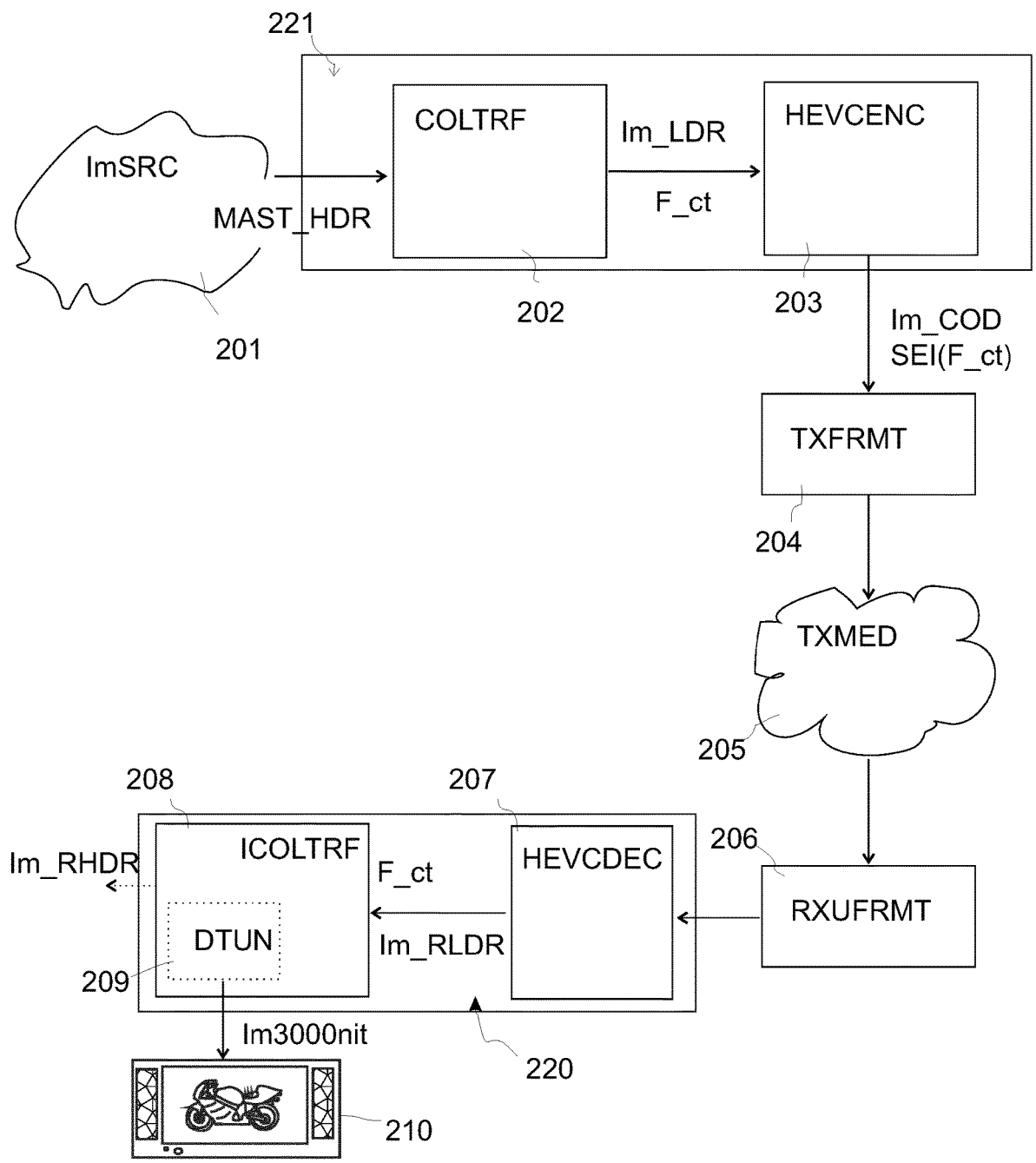
FIG. 2 schematically illustrates an example of a technology to encode high dynamic range images, i.e. images capable of having luminances of at least 700 nit (i.e. at least 7× the PB_C of the SDR image) typically or more (typically 1000 nit or more), which applicant recently developed, which actually communicates the HDR image(s) as an SDR image plus metadata encoding color transformation functions comprising at least an appropriate determined luminance transformation for the pixel colors, to be used by the decoder to convert the received SDR image(s) into HDR images(s) which are a faithful reconstruction of the original master HDR image(s) created at the image creation side.
Figure 3:
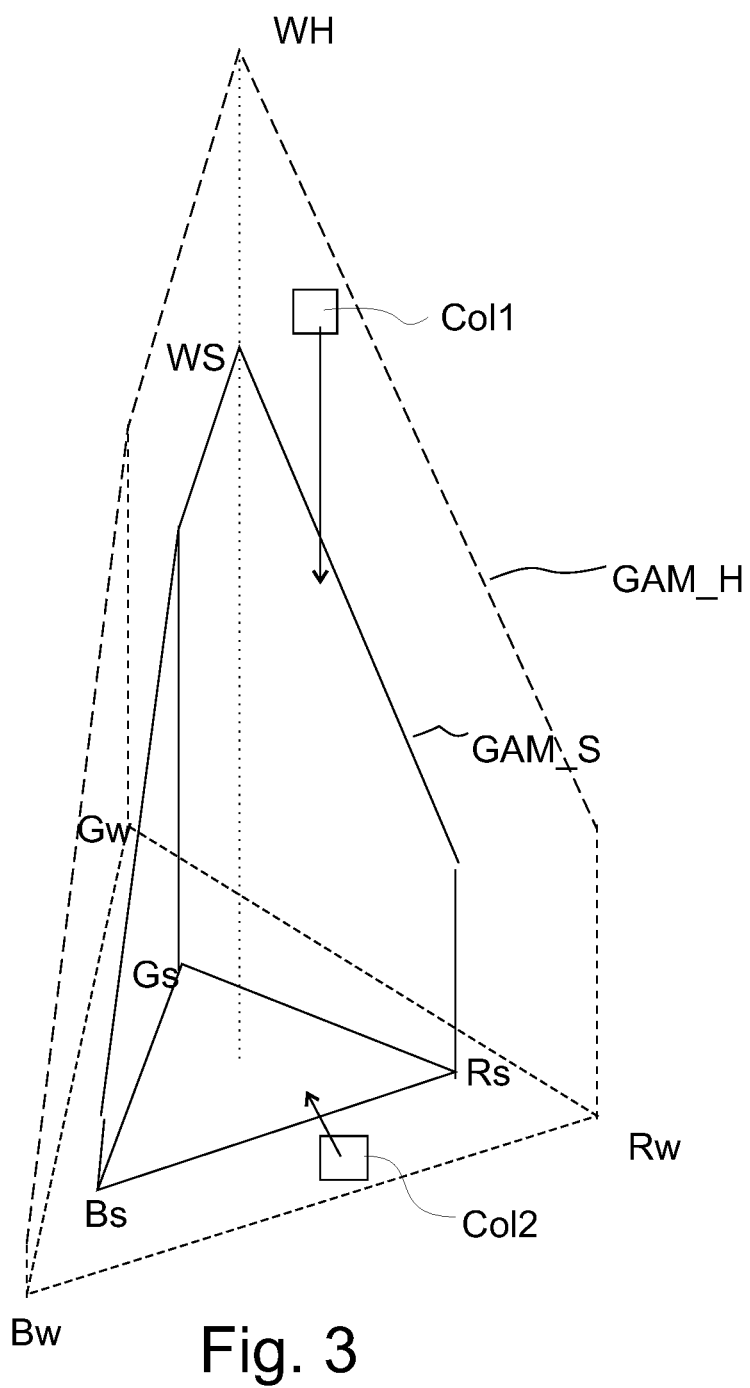
FIG. 3 schematically illustrates the color gamut of larger luminance dynamic range which is also wider (i.e. able to comprise more saturated colors), compared to a smaller color gamut, e.g. of an SDR image with Rec. 709 RGB primaries.
Figure 4:
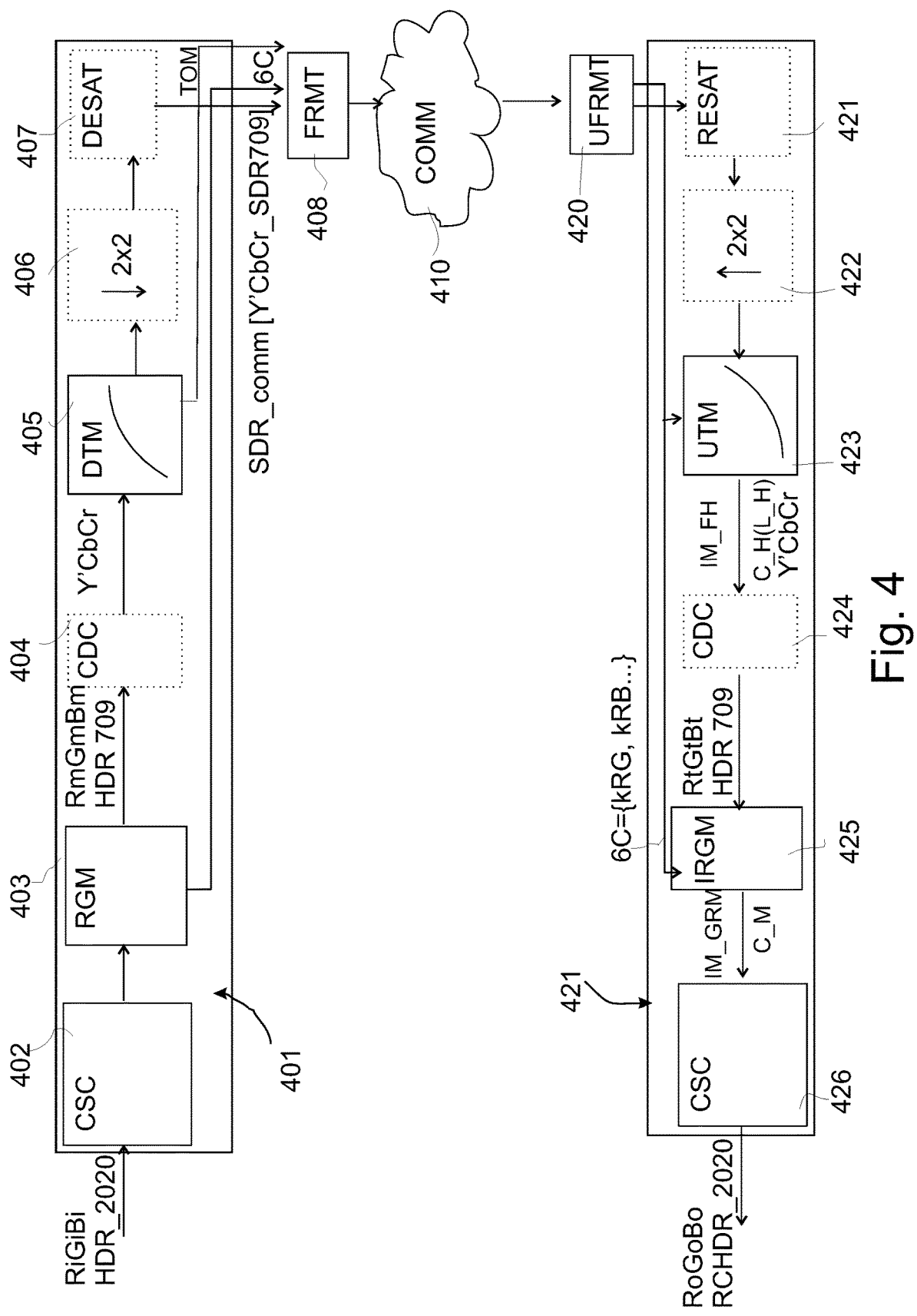
FIG. 4 schematically shows a useful more specific embodiment realizing the present invention's principles, comprising some useful components which need not be present in all embodiments of the present invented principles.

As seen in a typical exemplary coding chain FIG. 4, an HDR image (HDR_2020) which is inputted in the HDR image or video encoder (401), will first undergo a color space conversion by color convertor 402. The physical input for image or video pixel color data and metadata may be any typical video connection input, like e.g. a HDMI input, a connection to an antenna, an internet connection, etc., and the metadata (e.g. the optimal values for the below 6 k-factors for the present image) may be co-supplied according to any mechanism which allows metadata communication, e.g. SEI packets interspersed with the video packets, a dedicated metadata channel, etc.

This color space conversion is defined by matrix multiplication as (Rout,G_out,B_out)=(c11, c12, c13; c21, c22, c23; c31, c32, c33)*(R_in, G_in, B_in). One can understand that given the choice of the c-coefficients, for particular values of the input color RGB components, at least one of the output RGB components (e.g. B_out) could become negative. The latter would happen e.g. for a saturated yellow. This can happen even for low luminances (at the high end of the gamut other principles play as out of gamut issues). The problem is that negative values cannot be rendered on a SDR Rec. 709 display so something needs to be done. Highly complex mathematics could be applied, but ideally something simple yet sufficiently good is applied. Thereto these intermediate color components (R_out,G_out,B_out) are subsequently processed by gamut mapper 403, which applies a strategy of the type as shown in FIG. 5.

We first show in FIG. 5 what could be done, i.e. a first definition of a good method of making three bi-linear color component mapping functions which can create positive component values for the output colors of the calculation and the corresponding less saturated gamut mapped colors in the smaller typically Rec. 709 color gamut, but then later we indicate still a color problem with that, and how the gamut mapper actually does its optimal bi-linear mapping of the RGB color representation according to the invention, because that works better.

Figure 5A:
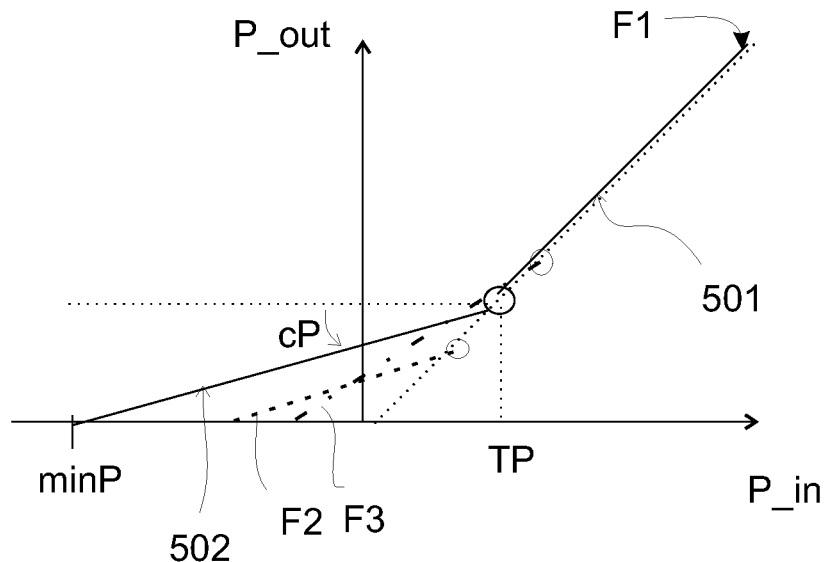
FIG. 5 schematically shows some example of three bi-linear color component mapping functions (F1, F2, F3) which one could use for HDR-as-SDR image generation and communication, and one inverse of such functions is also shown, which however are not the functions actually used because of non-ideal behavior in particular for dark colors.
Figure 5B:
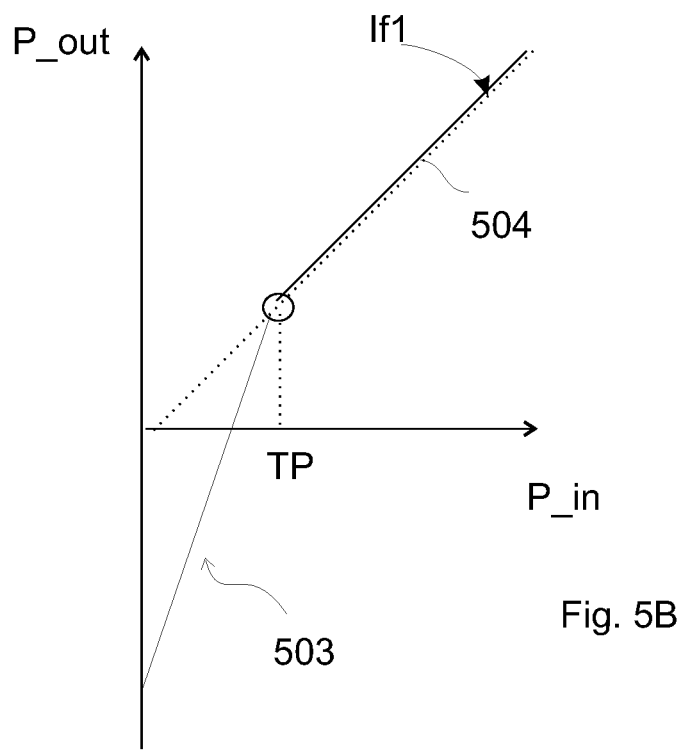

FIG. 5A shows (as a solid line) the first color component mapping function (F1), which should be applied to say the red primary. For this image, or scene of a number of temporally successive images, there are highly saturated cyan colors present, which leads to a large absolute value of negative red (minP). This can be treated by defining a function putting the threshold value TP for the red component mapping curve somewhat higher in the positive quadrant (because of the diagonality of the function being an identity transform for the color component in the 501 part, on the output axis the P_out value of that beginpoint will also be TP, as it will be in the decoding function shown in FIG. 5B). The other segment 502 will go to a value of minP on the x-axis. Typically this will be the most negative value occurring, or at least a value close to that if one allows for some small color error (irreversibility, in case one clips even more negative color component values also to zero). The other two functions (F2 and F3 for the green and blue channel are also shown, and as seen, they will typically have both a different value for their minimum point minP, and their threshold value TP, e.g. because the yellow colors in the image are not so highly saturated). At the decoder side the function will have the inverse shape, which can be determined from the communicated 6 parameters (6C), and it will give as output again negative numbers up to the most negative number, corresponding to the most saturated image color, which is representable in the wider gamut (e.g. Rec. 2020), but not in the narrower (Rec. 709). One would think initially that communicating e.g. the three TP (TP_red, Tp_green, TP_blue) and three minP values (minR, minG, minB) would be the ideal manner to specify the three color component mapping functions. Even, if one has fixed angle for the lower linear segment (502), then a TP value which could be optimally chosen would define the position of the minP.

There is however a non-ideality when using fixed 3 functions for all colors, namely that they don't scale nicely for all colors. Mapping from a negative color component (e.g. R=−0.2) to zero, means that the luminance increases considerably, and especially for dark colors, such an additional color contribution relative to the low color components of the dark input color can be problematic (see FIG. 7), leading to fluorescent colors.

Figure 7:
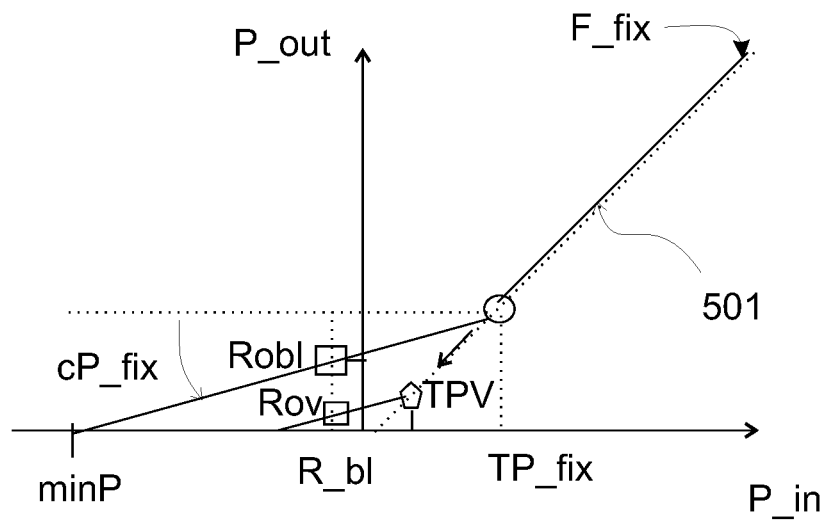
FIG. 7 shows the bi-linear mapping functions which are actually used by the newly invented gamut mapping strategy for HDR image coding, which actually in a simple manner realizes a luminance-optimal mapping behavior.

In FIG. 7 it is explained that if we were to use a fixed curve (F_fix) for mapping e.g. the red component, i.e. a curve defined by a single, fixed TP value TP_fix, then a dark color R_bl (which will have small components for R, G, and B) will be mapped to have a large output red color component Robl, leading to ugly incorrect and typically too bright colors (e.g. one of the desiderata of HDR imaging may be that in the SDR image as well as the HDR image, one may want to render a monster or criminal hiding in the dark so that he is just barely visible, and not rendered as too bright and reddish a conspicuous monster). So the inventor came up with a strategy that has a variable threshold (TPV), which optimally defines the respective component mapping curve depending on the luminance of the color (or more precisely, in that manner nulling the contribution of the luminance). The output Rov of that curve of the family of luminance-dependent curves will be much closer to the input.

The inventor preferably defines his TP values as follows:

$$TP\_red=kRG*\max(0,G\_in)+kRB*\max(0,B\_in)$$

So each one of the other two RGB color components contributes (with a strength determined by the respective k-factor) to the position of the threshold of the e.g. red color component if they are positive, and otherwise the formula gives a zero contribution for that component.

From which the component mapping curve and in particular the lower segment 502 can then be determined:

$$R\_out=\max(TP\_red+(R\_in-TP\_red)*cP\_red,R\_in)$$

R_out and R_in are respectively the output and input color component, with the red channel being chosen for the generic color component notation P_out and P_in, and cP_red is the angle compared to the horizontal with which the lower linear segment goes to minP.

The max operator will make sure that the identity transform will occur for color components larger than the TP, because the angle of the lower linear segment will always be chosen compressive, i.e. smaller than 45 degrees.

Similarly:

$$TP\_green=kGR*\max(0,R\_in)+kGB*\max(0,B\_in)$$

$$G\_out=\max(TP\_green+(G\_in-TP\_green)*cP\_green, G\_in)$$

$$TP\_blue=kBR*\max(0,R\_in)+kBG*\max(0,G\_in)$$

$$B\_out=\max(TP\_blue+(B\_in-TP\_blue)*cP\_blue,B\_in)$$

The inverse gamut mapping function in the decoder uses similar equations:

$$TP\_red=kRG*\max(0,G\_in)+kRB*\max(0,B\_in)$$

$$R\_out=\min(TP\_red+(R\_in-TP\_red)*(1/cP\_red),R\_in)$$

$$TP\_green=kGR*\max(0,R\_in)+kGB*\max(0,B\_in)$$

$$G\_out=\min(TP\_green+(G\_in-TP\_green)*(1/cP\_green),G\_in)$$

$$TP\_blue=kBR*\max(0,R\_in)+kBG*\max(0,G\_in)$$

$$B\_out=\min(TP\_blue+(B\_in-TP\_blue)*(1/cP\_blue), B\_in)$$

As the reader notices, the TP equation is the same.

As said, in most embodiments the angle for the three components will be fixed (and known at the decoder, to be e.g. 0.25 (doing some not too excessive colorimetric precision reduction for the seldomly occurring near gamut boundary colors which normally are not that critical anyway) unless communicated to have to be different), i.e. cP_red=cP_green=cP_blue=0.25, but the equations and principle also works with three optimized angles. These 6 kXX values (kRG, kRB, kGR, kGB, kBR and kBG) are the 6 parameters describing the necessary color component mapping curves that are typically communicated by the image or video creation side (i.e. the 6C), and as said, can be supplemented in some embodiments with further 3 parameters, in case variable angles cP_red, cP_green, and cP_blue, or 1 tuned cP value for the three RGB components the same, as desired.

The inventor found that in an embodiment, the kXX values can be calculated (at least some values, which can be improved to have a tighter match with the actual colors, hence less color errors in the SDR image, or the reconstructed HDR image) from the mapping matrix between the two color spaces, of the SDR and HDR image.

$$kRG=(cRG/cRR)*cP/(1.0-cP)$$

$$kRB=(cRB/cRR)*cP/(1.0-cP)$$

$$kGR=(cGR/cGG)*cP/(1.0-cP)$$

$$kGB=(cGB/cGG)*cP/(1.0-cP)$$

$$kBR=(cBR/cBB)*cP/(1.0-cP)$$

$$kBG=(cBG/cBB)*cP/(1.0-cP)$$

In case of three variable cP values, the equations will get their respective cP value.

E.g., if one takes a color space conversion matrix for mapping between Rec. 709 and Rec. 2020:
[cRR, cRG cRB [0.62740.3293 0.0433
cGR cGG cGB=0.0691 0.9195 0.0114
cBR cBG cBB] 0.0164 0.0880 0.8956]
We get kRG=(0.3293/0.6274)*(0.25/0.75)=0.5249/3=0.175; kRB=0.023; kGR=0.025; kGB=0.004; kBR=0.006 and kBG=0.033.

The highest TP value will then typically be approximately ⅙ (namely 0.175), but for those high brightness colors near white, the color component will be higher than TP, i.e. the color stays unchanged because it will fall on the identity transform segment 501.

Continuing with FIG. 4, after performing the reversible gamut mapping by gamut mapper 403, a mapped color (RmGmBm) exists for the respective processed pixels. The resulting image is still a HDR image, because it still has the same pixel luminances substantially, but it is a narrow gamut, Rec. 709-defined HDR image. Optionally in several useful embodiments the image will subsequently be processed by a color description convertor 404, which represents the RGB colors as Y'CbCr colors, because it is then easy to do the luminance mapping on the Y' component (but in other embodiments following the same principles the luminance transformation may actually happen on an RGB color representation, and then that unit may not be present, which is why it is drawn dotted). Subsequently luminance mapper 405 applies a luminance mapping curve TOM, which for converting to SDR may typically have the shown gamma function shape with a gamma <1, but obviously for more complex HDR scene images may be far more complex (but that is no useful aspect to bother the reader with in the present application). Subsequently a spatial down-sampler may oftentimes advantageously be present, but obviously that is no necessary component for all the embodiments of the present invention either. Then a desaturation unit 407 may be present. When applying the luminance mapping function, which typically raises the relative brightness (although we generically formulated the mapping between HDR and SDR luminance as giving different luminances, as the direction can in principle by either way, also depending on whether it happens on an absolute or normalized to 1 luminance representation, and depending on the position of the luminance along the range of all luminances), it can happen that highly saturated colors run out of gamut at the upper part of the gamut, i.e. near the white point having PB_C as luminances. Especially for chromaticity-preserving (as they ideally should) luminance mappings, that would typically not correspond to more saturated resultant colors after the luminance mapping. But because, compared to the triangle of possible colors on the ground plane of zero luminance, in the tip of the gamut one can only make colors of increasingly lesser saturation the higher their luminance becomes, one may still map outside of the gamut of reproducible colors by the luminance transformation. For solving this the desaturation unit may typically apply a multiplicative desaturation on the three R,G,B components making them more similar, with a multiplier which may typically depend on the Max(R',G',B')−Y' value of the color being processed (the prime ' indicating that these are non-linear RGB coordinates calculated from the linear ones via the Rec. 709 OETF). The resultant image SDR_comm, is an SDR image (i.e. with the correct object luminances for rendering a reasonable SDR version of the HDR scene on SDR displays), and with the correct colorimetry, i.e. defined according to Rec. 709 primaries, with colors which not only all exist in the Rec. 709 SDR gamut, but are also faithfully reconstructable the Rec. 2020 HDR colors, in fact allowing a faithful reconstruction of the original master HDR image HDR_2020. After suitably formatting the data by formatter 408, e.g. HEVC video compression etc., that image is communicated over some communication channel 410, such as a cable, internet, and optical disk, etc. At any receiving side, a receiver will first use an unformatter 420 to make the image suitable for processing, i.e. we assume a pixellized image with e.g. Y'CbCr pixel colors, and then apply the inverse operations of the encoder. I.e. resaturation by resaturation unit 421, spatial upconversion by spatial upconverter 422, SDR-to-HDR luminance mapping by luminance mapper 423, which applies at least approximately the inverse functional shape of TOM, yielding an intermediate now HDR image IM_FH. A color definition converter 424 converts the Y'CbCr colors into RGB colors (i.e. the same colors, but differently defined). Then inverse gamut mapper 425 applies the inverse gamut mapping three functions (see FIG. 5B), and finally the inverse matrix of the one used for encoding is used by color space convertor 426 to redefine the already gamut remapped RGB colors (which will have negative values when still in Rec. 709) to the Rec. 2020 definition (so that all RGB components become positive again). That yields the faithful definition of the HDR saturated color image (RCHDR_2020) with pixels having RGB output color components (Ro,Go,Bo).

Figure 6:
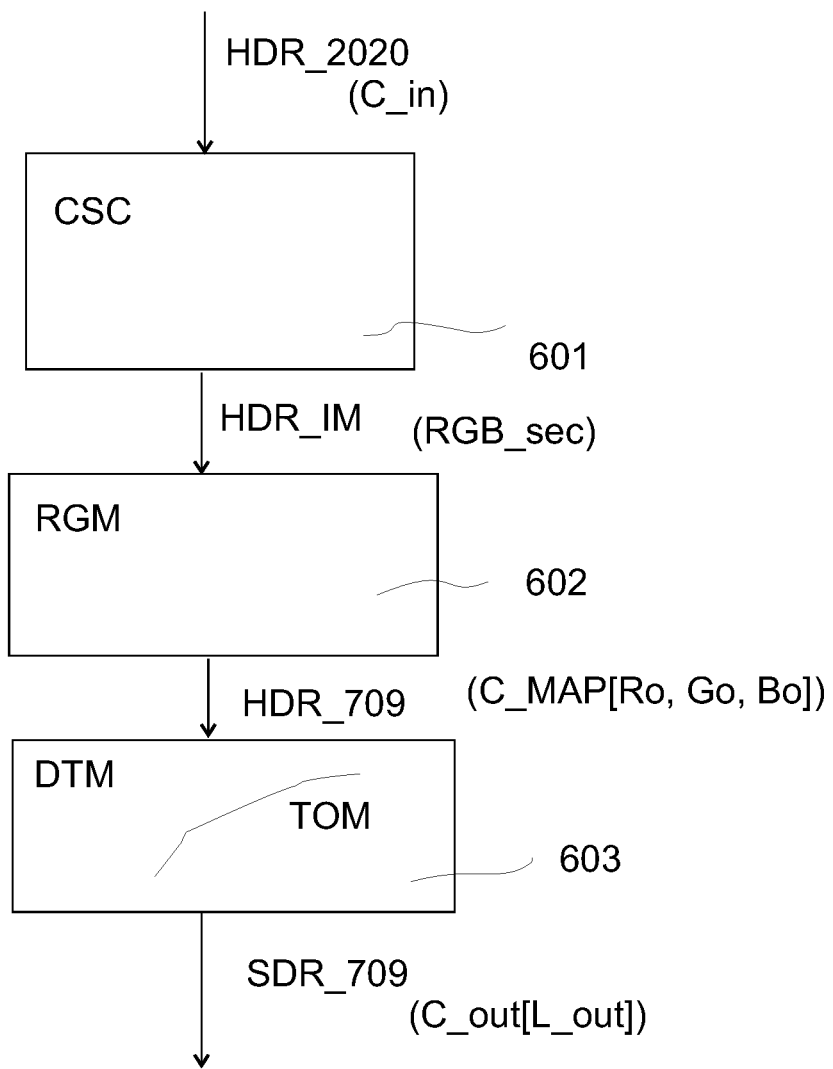
FIG. 6 schematically shows a flow chart corresponding to the encoding method elucidating the newly invented principles.

FIG. 6 shows a block diagram for elucidating the basic encoding method.

The input HDR image to be encoded HDR_2020 (e.g. color graded as a movie image, or straight from camera or minimally processed in a live television production, etc.) is first color space converted (method step 601), which yields intermediate HDR image HDR_IM with colors defined in second RGB color representation (RGB_sec). These colors are then reversibly gamut mapped in step 602, by the method elucidated in FIG. 5, to obtain the output colors C_MAP (which are now not just differently represented mathematically, but some colors are also different, in that at least one color has become less saturated, because of the transformation of a negative color component value into a positive one), represented that color components Ro,Go,Bo, of a narrower gamut, less saturated still HDR image (HDR_709). Lastly a luminance mapping step 603 with luminance mapping function TOM is applied, for making this a SDR image with changed pixel luminances, yet still in the same Rec. 709 color space i.e. with substantially identical or identical color chromaticities before and after the luminance mapping. This yields the final SDR image SDR_709 to be communicated (after potentially some further processing, and at least formatting appropriate to the elected communication manner), having pixel color C_out comprising luminances L_out.

The inventor found that, because as one can see that all the equations (for the TP values and the mapping function) scale with increasing luminance, the mapping in fact equivalently happens luminance-independently, and can hence be represented in the luminanceless chromaticity diagram, e.g. the well-known CIE (x,y).

Figure 8A:
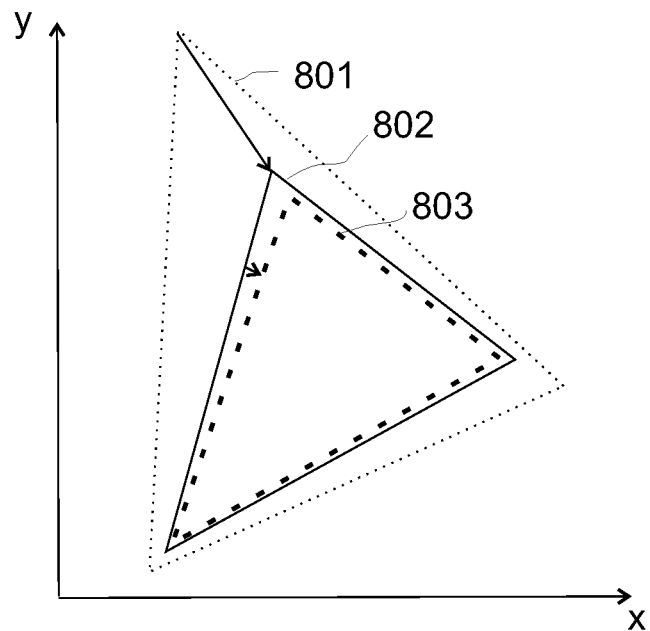
FIG. 8 shows some practical results in the (x,y) chromaticity plane obtained when implementing an example of such a novel gamut mapping.
Figure 8B:
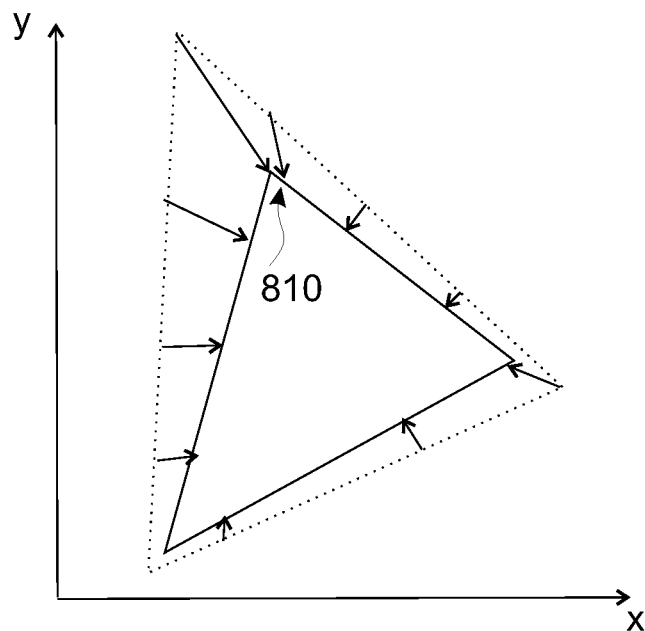
Figure 9:
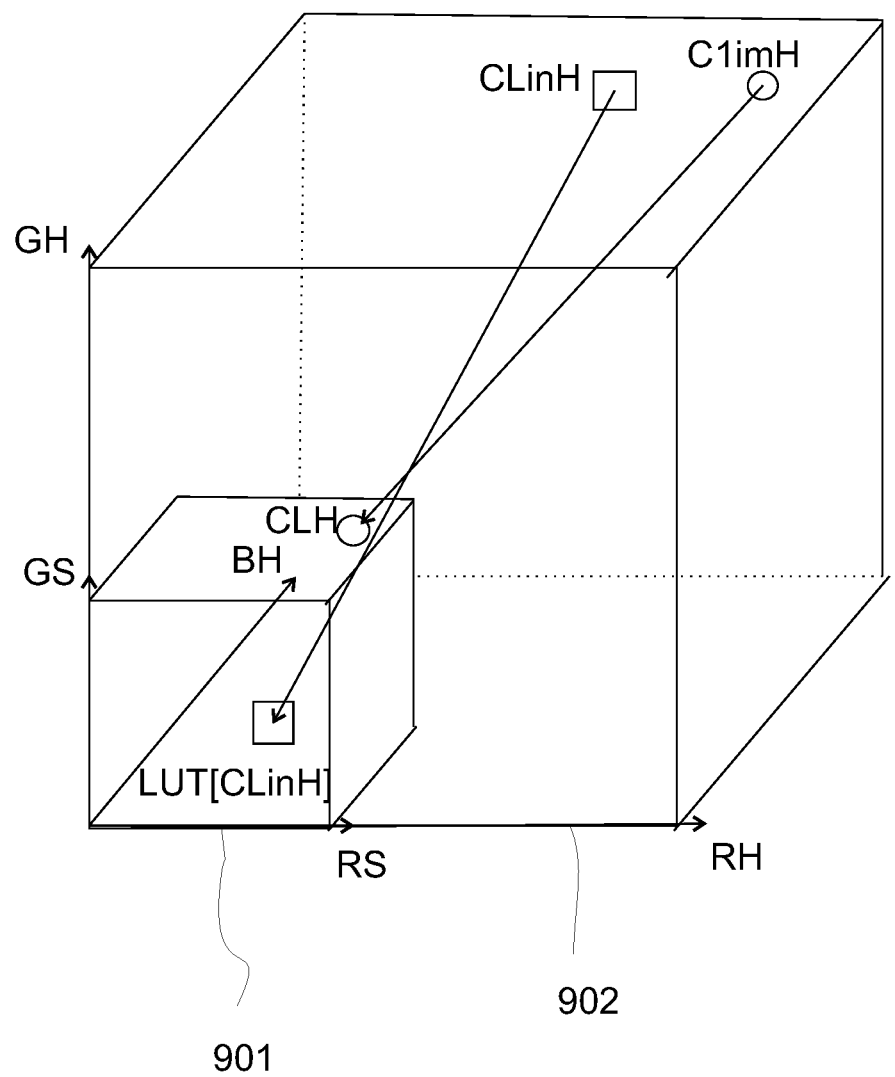
FIG. 9 illustrates some possible global color volume mappings, which map the colors in a 3D first volume to a second 3D volume, which illustrates some aspects that can be done with prior art technology.

FIG. 8 shows some exemplary practical results. In FIG. 8A we elucidate which color shifts are made (necessarily, because the narrower Rec. 709 gamut needs less saturated colors). When mapping from Rec. 2020 gamut (801) to Rec. 709 gamut (802), obviously not only the out-of-gamut colors change, because some room has to be made inside the Rec. 709 gamut to squeeze those highly saturated Rec. 2020 colors in the Rec. 709 gamut. However, all colors within the dashed triangle 803 are unaffected, which is quite good. I.e. the colors within that triangle are processed by the linear segment 501 which realizes an identity transform, and the mapping between the dotted triangle 801 and the dashed triangle 803 is realized by the 502 linear segments of the curves. In FIG. 8B we see the mapping results for some typical extremely saturated colors, in particular colors located on the boundary of the Rec. 2020 triangle. We see some hue shifts of the present method, which is especially clear in region 810, but only for the case if such extreme colors actually occur, which makes the method quite sufficient in practice.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A method of converting a high dynamic range image into a standard dynamic range image comprising:
    performing a color space conversion,
        wherein the color space conversion comprises applying a color matrix to input colors of pixels of the high dynamic range image,
        wherein the input colors are defined according to a first RGB representation which is defined according to first red, green and blue primaries, and which consists of a first red, green, and blue color component of the pixel color,
        wherein the pixels have a first color saturation,
        wherein the color matrix maps a first RGB representation of the first color to a second RGB representation,
        wherein the second RGB representation is defined according to second red, green and blue primaries,
        wherein the second red, green and blue primaries span a smaller color triangle than the first red, green and blue primaries,
        wherein the application of the color matrix yields an intermediate image, in which the pixel colors have the second RGB representation;
    applying a reversible gamut mapping to the second RGB representation, yielding a mapped color which has a second saturation which is smaller than the first color saturation; and
    applying a luminance mapping to the luminance of the mapped color, to obtain an output color,
        wherein the output color has a luminance different than the luminance of the mapped color,
        wherein the reversible gamut mapping comprises applying a mapping function to each of the three color components of the second RGB representation to obtain output red, green and blue pixel color components which define the mapped color,
        wherein each of the respective mapping functions comprise a first linear segment and a second linear segment,
        wherein the first linear segment corresponds to an identity transform,
        wherein the first linear segment begins at a threshold value,
        wherein the second linear segment goes from the threshold value to a minimal value,
        wherein the minimal value is the most negative value occurring in the intermediate image for the respective component of the second red, green or blue color components of the second RGB representation, wherein the respective threshold value is calculated by multiplying the values of the two components of the second RGB representation other than the color component for which the respective threshold value is calculated by respective constants in case such values of the two components are larger than zero, and summing those two multiplied contributions such that threshold value of red=kRG*max(0, green color component of the second RGB representation)+kRB*max(0, blue color component of the second RGB representation);

threshold value of green=kGR*max(0, red color component of the second RGB representation)+kGB*max(0, blue color component of the second RGB representation);

threshold value of blue=kBR*max(0, red color component of the second RGB representation)+kRG*max(0, green color component of the second RGB representation), in which kRG, kRB, kGR, KGB, kBR and kBG are constants.

2. The method as claimed in claim 1,
wherein each of the respective mapping functions have the same value for an angle,
wherein the angle is defined as starting from the horizontal direction,
wherein the angle defines the direction of the second linear segment,
wherein the angle is either predefined or determined based on the distribution of colors in the high dynamic range image.

3. The method as claimed in claim 1,
wherein each of the respective mapping functions have a different value of the angle,
wherein the angle is defined starting from the horizontal direction,
wherein the angle defines the direction of the second linear segment of the respective one of the respective mapping functions,
wherein the respective angles are determined based on the distribution of colors in the high dynamic range image.

4. The method as claimed in claim 1, in which the low dynamic range image has its colors defined according to Rec. 709 primaries.

5. The method as claimed in claim 1, in which the high dynamic range image has its colors defined according to wide gamut primaries.

6. A high dynamic range image encoder comprising:
a color space convertor,
wherein the color space convertor is arranged to apply a matrix conversion from a color of at least one pixel of a high dynamic range image to output an intermediate high dynamic range image,
wherein the matrix conversion maps a first RGB representation to a second RGB representation,
wherein the first RGB representation is defined by first red, green and blue primaries,
wherein the second RGB representation is defined by second red, green and blue primaries,
wherein the second RGB representation has at least one less saturated primary than the corresponding primary of the first RGB representation,
wherein the second red, green and blue primaries define a smaller chromaticity triangle than the first red, green and blue primaries;
a gamut mapper,
wherein the gamut mapper is arranged to apply a reversible gamut mapping to the color of the at least one pixel, and output a color mapped high dynamic range image in which the at least one pixel has a less saturated color; and
a luminance mapper,
wherein the luminance mapper is arranged to apply a luminance mapping function to the luminance of the color of the at least one pixel in the color mapped high dynamic range image,
wherein the luminance mapper is arranged, to calculate an output color having an output luminance for the at least one pixel which is different from the color mapped luminance,
wherein the luminance mapper is arranged to output the output color in a standard dynamic range output image,
wherein the standard dynamic range output image has a peak brightness of 100 nit,
wherein the gamut mapper is arranged to apply a gamut mapping algorithm which comprises applying respective mapping curves to the respective second red, green and blue color components of the second RGB representation to obtain output red, green and blue color components,
wherein each of the respective mapping functions comprises a first linear segment and a second linear segment,
wherein the first segment corresponds to an identity transform,
wherein the first linear segment begins at a threshold value,
wherein the second linear segment maps between the respective threshold value for each of the first red, green or blue color components and a respective minimal value for each of the first red, green or blue color components,
wherein the minimal value is the most negative value occurring in the intermediate high dynamic range image for the respective second red, green or blue color component of the second RGB representation,
wherein the respective threshold value is calculated by multiplying each of the two components of the second RGB representation other than the color component for which the threshold value is calculated by a respective constant in case the value of said respective one of the two components is larger than zero, and summing those two multiplied contributions such that threshold value of red=kRG*max(0,green color component of second RGB color representation)+kRB*max (0, blue color component of second RGB color representation);

threshold value of green=kGR*max(0, red color component of second RGB color representation)+kGB*max (0, blue color component of second RGB color representation);

threshold value of blue=kBR*max(0, red color component of second RGB color representation)+kBG*max (0, green color component of second RGB color representation), in which kRG, kRB, kGR, KGB, kBR and kBG are constants.

7. The high dynamic range image encoder as claimed in claim 6,
wherein the gamut mapper is arranged to apply the respective mapping curves which have a same value of an angle,
wherein the angle is defined starting from the horizontal direction of the second linear segment for the respective curves.

8. The high dynamic range image encoder as claimed in claim 6,
wherein each of the gamut mapper is arranged to apply the respective mapping curves which have a different value of the angle,
wherein the angle defined starting from the horizontal direction of the second linear segment for the respective curves.

9. The high dynamic range image encoder (401) as claimed in claim 6, wherein the color space convertor and the gamut mapper are configured to encode an input high dynamic range image defined in a color space defined by Rec. 2020 color primaries, as a standard dynamic range image having its colors defined in a color space defined by Rec. 709 color primaries.

10. A method of decoding a high dynamic range image which is received encoded as a standard dynamic range image comprising:
applying a luminance mapping to the standard dynamic range image to obtain an intermediate high dynamic range image,
wherein the luminance mapping is defined as a received luminance mapping function applied to the luminance of a color of at least one pixel of the standard dynamic range image to obtain a mapped high dynamic range color for the at least one pixel,
wherein the at least one mapped pixel color is stored in a first intermediate high dynamic range image;
applying an inverse gamut mapping yielding a gamut remapped image with pixels having gamut remapped colors; and
applying a color space conversion to the gamut remapped colors of the pixels of the gamut remapped image, to obtain output colors in an output high dynamic range image,
wherein the color space conversion comprises applying a matrix for transforming the colors represented as a first RGB color representation of the standard dynamic range image to a second RGB color representation of the high dynamic range image,
wherein the first RGB color representation is defined with a first set of red, green and blue primaries,
wherein the second RGB color representation is defined with a second, different set of red, green and blue primaries,
wherein the second set of red, green and blue primaries comprises at least one primary is more saturated than the corresponding primary in the first set of red, green and blue primaries,
outputting the output high dynamic range image,
wherein the inverse gamut mapping comprises applying respective mapping functions to each of the respective red, green and blue RGB color components of the intermediate high dynamic range image to obtain gamut remapped red, green and blue color components of the gamut remapped color,
wherein each of the respective mapping functions comprise a first linear segment and a second linear segment,
wherein the first segment corresponds to an identity transform,
wherein the first linear segment begins at a threshold value for each of the mapped red, green or blue color components,
wherein the second linear segment maps to a respective most negative value of the respective gamut remapped red, green or blue color components in case the respective mapped color component of the intermediate high dynamic range image HDR color is zero,
wherein the respective threshold value is calculated by multiplying the values of the two components of the second RGB representation other than the color component for which the threshold value is calculated by respective constants in case such a value is larger than zero, and summing those two multiplied contributions such that
threshold value of red=kRG*max(0,green color component of second RGB color representation)+kRB*max (0, blue color component of second RGB color representation);
threshold value of green=kGR*max(0, red color component of second RGB color representation)+kGB*max (0, blue color component of second RGB color representation);
threshold value of blue=kBR*max(0, red color component of second RGB color representation)+kBG*max (0, green color component of second RGB color representation), in which kRG, kRB, kGR, KGB, kBR and kBG are constants.

11. The method of decoding a high dynamic range image as claimed in claim 10,
wherein the three angles are defined starting from the vertical direction of the second linear segment, and
wherein each of the respective angles are different, and received from an encoder of the image as metadata.

12. The method of decoding a high dynamic range image as claimed in claim 10,
wherein each of the respective angles is defined starting from the vertical direction of the second linear segment,
wherein each of the respective angles is the same, and
wherein each of the respective angles is either fixed and known by the method, or received from an encoder of the image as metadata.

13. The method of decoding a high dynamic range image as claimed in claim 10,
wherein the respective constants for multiplication are calculated on the basis of matrix coefficients,
wherein defining the relationship between the RGB values of any color as represented in the first RGB color representation and the RGB values of any color as represented as the second RGB color representation of the high dynamic range image according to: kRG= (cRG/cRR)*cP_red/(1.0−cP_red), kRB=(cRB/cRR) *cP_red/(1.0−cP_red), kGR=(cGR/cGG)*cP_green/ (1.0−cP_green), kGB=(cGB/cGG)*cP_green/(1.0− cP_green), kBR=(cBR/cBB)*cP_blue/(1.0−cP_blue), kBG=(cBG/cBB)*cP_blue/(1.0−cP_blue), in which the cXX coefficients are the said matrix coefficients, and the respective cP_X values are the angles.

14. The method of decoding a high dynamic range image as claimed in claim 10 wherein the standard dynamic range image is defined in a color space defined with Rec. 709 RGB color primaries.

15. A high dynamic range image decoder which receives a high dynamic range image encoded as a standard dynamic range image comprising:
a luminance mapper,
wherein the luminance mapper is arranged to obtain a received luminance mapping function and apply it to the luminance of at least one pixel of the standard dynamic range image to obtain an intermediate high dynamic range image with pixels having mapped colors, an inverse gamut mapper,
  wherein the inverse gamut mapper is arranged to apply color mapping functions which perform the inverse of the gamut mapping which was applied at an encoding site,
  wherein data defining the shape of the color mapping functions has been received,
  wherein the inverse gamut mapper is arranged to yield a gamut remapped image in which the pixels have gamut remapped colors; and
a color space convertor,
  wherein the color space converter is arranged to apply a color conversion to the gamut remapped colors of the pixels of the gamut remapped image, to obtain output colors of pixels in an output high dynamic range image,
  wherein the color conversion comprises applying a matrix for transforming the colors represented as a first RGB color representation of the standard dynamic range image defined according to first red, green and blue primaries to a second RGB color representation of the high dynamic range image according to different second red, green and blue primaries,
  wherein at least one primary of the second set of RGB primaries is more saturated than the corresponding primary in the first set of RGB primaries,
  wherein the color space converter is arranged to output the output high dynamic range image,
wherein the inverse gamut mapper is arranged to apply respective mapping functions to each of the respective red, green and blue components of the mapped colors of the pixels of the intermediate high dynamic range image to obtain corresponding gamut remapped red, green and blue color components of the gamut remapped color,
  wherein each of the respective mapping functions comprise a first linear segment and a second linear segment,
  wherein the first segment corresponds to an identity transform,
  wherein the first linear segment begins at a threshold value,
  wherein the second linear segment has an a angle for each of the red, green or blue color primaries,
  wherein the angle is defined starting from the vertical direction which maps a zero input value to a negative value of the respective gamut remapped red, green or blue color component,
  wherein the negative value is substantially equal to the most negative value of that color component occurring in the original high dynamic range image which was encoded by an encoder,
  wherein the respective threshold value is calculated by multiplying the values of the two components of the second RGB representation other than the color component for which the respective threshold value is calculated by respective constants in case said color component has a value larger than zero, and summing those two multiplied contributions such that
  threshold value of red=kRG*max(0,green color component of second RGB color representation)+kRB*max (0, blue color component of second RGB color representation);
  threshold value of green=kGR*max(0, red color component of second RGB color representation)+kGB*max (0, blue color component of second RGB color representation);
  threshold value of blue=kBR*max(0, red color component of second RGB color representation)+kBG*max (0, green color component of second RGB color representation), in which kRG, kRB, kGR, KGB, kBR and kBG are constants.

16. The high dynamic range image video decoder as claimed in claim 15,
  wherein the inverse gamut mapper is arranged to apply the color mapping functions on the respective red, green or blue color primaries,
  wherein respective functions have a same value for the angle of the second linear segment.

17. The high dynamic range image video decoder as claimed in claim 15, wherein the different angles, or the same angle are received as metadata which was created by the encoder of the image.

18. The high dynamic range image video decoder as claimed in claim 15, wherein the constants for the multiplication in the determination of the thresholds are received via a metadata input.

19. The high dynamic range image video decoder as claimed in claim 15, wherein the constants for the multiplication in the determination of the thresholds are calculated by the decoder based on the matrix coefficients according to: kRG=(cRG/cRR)*cP_red/(1.0−cP_red), kRB=(cRB/cRR)*cP_red/(1.0−cP_red), kGR=(cGR/cGG)*cP_green/(1.0−cP_green), kGB=(cGB/cGG)*cP_green/(1.0−cP_green), kBR=(cBR/cBB)*cP_blue/(1.0−cP_blue), kBG=(cBG/cBB)*cP_blue/(1.0−cP_blue), in which the cXX coefficients are the said matrix coefficients, and the respective cP_X values are the angles, which may be the same for the RGB color components or different.

20. The high dynamic range image video decoder as claimed in claim 15, wherein the inverse gamut mapper and the color space convertor are arranged to decode the high dynamic range image from a standard dynamic range image which is defined according to Rec. 709 RGB primaries.

* * * * *